(12) United States Patent
Skibinski et al.

(10) Patent No.: US 6,208,537 B1
(45) Date of Patent: Mar. 27, 2001

(54) SERIES RESONANT SINEWAVE OUTPUT FILTER AND DESIGN METHODOLOGY

(75) Inventors: Gary L. Skibinski, Milwaukee; Brian R. Buchholz, Pewaukee, both of WI (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/407,621

(22) Filed: Sep. 28, 1999

(51) Int. Cl.$^7$ ........................................... H02M 1/12
(52) U.S. Cl. ................................... 363/40; 363/41
(58) Field of Search ............................... 363/39, 40, 41; 307/105; 323/205, 207

(56) References Cited

U.S. PATENT DOCUMENTS

| | | | |
|---|---|---|---|
| 3,900,792 | * 8/1975 | Moltgen | 323/207 |
| 4,812,669 | * 3/1989 | Takeda et al. | 307/105 |
| 5,345,375 | * 9/1994 | Mohan | 363/40 |
| 5,526,252 | * 6/1996 | Erdman | 363/41 |
| 5,949,221 | * 9/1999 | Edwards | 323/209 |

* cited by examiner

Primary Examiner—Adolf Deneke Berhane
(74) Attorney, Agent, or Firm—Michael A. Jaskolski; John J. Horn; William R. Walbrun

(57) ABSTRACT

An apparatus to be used with a PWM VSI which is linked by voltage supply cables to either a passive or a dynamic load, the VSI providing voltages on the cables which have at least one primary harmonic component, the apparatus linked to the output terminals of the VSI and including a line inductor between each output terminal and the load and, for each cable, at least one resonant filter branch including an inductor and a capacitor linked to each of the supply lines and to a common node wherein the line inductors are chosen so as to limit filter current and the branch elements are chosen such that a resonant frequency thereof is essentially equal to the frequency of the primary harmonic component.

35 Claims, 17 Drawing Sheets

US 6,208,537 B1

SERIES RESONANT SINEWAVE OUTPUT FILTER AND DESIGN METHODOLOGY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Often a need arises to provide variable-frequency/amplitude voltage to a load. One commonly used method to provide a variable frequency/amplitude voltage is with a Pulse Width Modulated (PWM) Voltage Source Inverter (VSI). Positive and negative DC bus voltages are provided to a VSI and, in a three phases system, three voltage supply cables link VSI outputs to a load. Exemplary VSIs include switches which are controlled to alternately link the supply cables to the positive and negative DC buses thereby producing high frequency voltage pulses on the cables. The changing average voltages of the pulses on each cable over a period defines a fundamental low frequency alternating voltage on the cable having an amplitude and a frequency.

Amplitude of the cable voltage is controlled by adjusting the ratio of positive to negative phase portions of each high-frequency pulse. Frequency of the cable voltage is controlled by altering the period over which the average high-frequency pulses alternate from positive phase to negative phase.

A controller is linked to each of the VSI switches and provides separate control signals to the switches to control the pulses. To determine when to turn switches on and off the controller receives three modulating signals Vm and a carrier signal Vc. An exemplary carrier signal Vc and a small portion of an exemplary modulating signal Vm are illustrated in FIG. 2. Carrier signal Vc includes a saw tooth signal having a relatively high carrier frequency $f_c$ and a peak carrier amplitude $\hat{V}_c$ and is generally kept constant throughout control operation. Modulating signals Vm typically include sinusoidal signals (only a portion shown in FIG. 2) having relatively lower frequencies $f_m$ and a peak amplitude $\hat{V}_m$. The controller compares the reference and carrier signals and, based on relative magnitudes, turns switches on and off in a manner well known in the controls industry. Because the reference signals are sinusoidal the resulting fundamental voltage on each cable is also, ideally, essentially sinusoidal.

In the controls art an amplitude modulation index is defined as:

$$m_a = \frac{\hat{V}_m}{\hat{V}_c} \qquad \text{Eq. 1}$$

while a frequency modulation index is defined as:

$$m_f = \frac{f_c}{f_m} \qquad \text{Eq. 2}$$

As well known in the controls industry, high frequency PWM AC voltage pulses at the VSI outputs cause PWM harmonics which are often not tolerable when provided to a passive loads. Similarly, under certain conditions, high frequency PWM AC voltage pulses will cause a dynamic load such as a three phase Y-connected motor to overheat. This is because high iron core losses and high winding resistance copper losses are associated with high-frequency PWM harmonics applied to motor terminals.

The PWM VSI line-to-neutral output voltage harmonic spectrum is determined by conventional Fourier analysis of the high frequency pulsed voltage waveforms which are provided on voltage supply cables. Line-to-neutral voltage is defined as from a line or cable to a "zero voltage" reference node between the positive and negative DC rails. The mathematics of Fourier analysis defines an equivalent voltage source representation for a pulsed waveform which is a series sum of a sinewave fundamental voltage and sinewave harmonic voltages. Thus, a PWM VSI line-to-neutral output voltage source may be viewed as a sum of a sinewave fundamental voltage at the fundamental output frequency $f_1$ in series with all the sinewave harmonic voltages $V_h$ at associated harmonic frequencies $f_h$ which comprise the waveform as determined from the Fourier analysis.

$\hat{V}_p$ is the peak amplitude of the line-to-neutral sinewave fundamental frequency voltage component referenced to the zero reference node, and is defined as:

$$\hat{V}_p = m_a \cdot \frac{V_{dc}}{2} \qquad \text{Eq. 3}$$

The rms fundamental line-to-line voltage $(V_{\|})_1$ is therefore:

$$(V_{ll})_1 = \frac{\sqrt{3}}{\sqrt{2}}(\hat{V}_p) = \frac{\sqrt{3}}{\sqrt{2}} m_a \cdot \frac{V_{dc}}{2} = 0.612 m_a \cdot V_{dc} \qquad \text{Eq. 4}$$

Theoretically, the harmonic voltage frequencies $f_h$ are also equally well defined for those skilled in the art and are:

$$f_h = (h)f_1 = (jm_f \pm k)f_1 f_c \pm kf_1 \qquad \text{Eq. 5}$$

where j is an integer and k is an integer representing a particular sideband. Thus, the harmonic voltages $f_h$ in the inverter output voltage waveform appear as sidebands centered around the carrier switching frequency $f_c$ and its multiples (e.g., $2f_c$, $3f_c$, $4f_c$, etc.) This general pattern holds true for all values of $m_a$ in the range between 0 and 1.

Rms harmonic components of the inverter line-to-line output voltage $(V_{11})_h$ can be calculated from a normalized harmonic table as well known in the art. The harmonic amplitudes are tabulated in Table 1 as a function of amplitude modulation ratio ma and assuming an odd frequency modulation index $m_f$ which is greater than 9. Only those harmonics with significant amplitudes up to j=4 (see Eq. 5) are included in Table 1.

As an example of how to calculate the values in Table 1, assume a 480 V 60 Hz sinewave system voltage is applied to a variable speed drive input having a 6 pulse diode bridge front end and a VSI output which powers a 460 V 60 Hz motor @ 52 Hz. The VSI $V_{dc}$ bus voltage is 1.35*480 V or 650 $V_{dc}$, using conventional bridge rectifier AC/DC conversion formulas. At 52 Hz the motor requires a fundamental rms voltage component of (52 Hz/60 Hz)*460 V or 399 Vrms. The normalized fundamental component ratio is thus $[(V_{11})_1/V_{dc}]$ or [399/650 =0.612]. From Table 1, this corresponds to a modulation index ratio of $m_a$=1. Examination of the $m_a$=1.0 column shows that the harmonic voltages centered at the carrier frequency $f_c$ and twice the carrier frequency $2f_c$ are the two highest harmonic voltage magnitudes which contribute to a non-sinusoidal output voltage. Specifically, from Equation 5, these particular line-to-line harmonic rms voltages exist with 126.75 Vrms @ $f_c$+/−104 Hz and 72.5 Vrms @ $2f_c$+/−52 Hz.

In general Table 1 shows that $f_c$ harmonics only become dominant in the 30 Hz to 60 Hz range while the $2f_c$ harmonics are dominant throughout the 0 to 60 Hz range.

TABLE 1

Generalized harmonics of $V_{11}$ for a large and odd mf > 9
[$(V_{11})_h/V_{dc}$] Tabulated as Function of $m_a$, where $(V_{11})h$ is rms Value of the Harmonic Voltages

| Modulation Index ($m_a$) | 0.2 | 0.4 | 0.6 | 0.8 | 1.0 |
|---|---|---|---|---|---|
| Fundamental Component (h = 1) [$(V_{11})_1/V_{dc}$] | 0.122 | 0.245 | 0.367 | 0.490 | 0.612 |
| Typical output frequency (Hz) [for 460 V, 60 Hz load] | 10 | 20 | 31 | 42 | 52 |
| [$(V_{11})_h/V_{dc}$] | | | | | |
| $m_f \pm 2$ | 0.010 | 0.037 | 0.080 | 0.135 | 0.195 |
| $m_f \pm 4$ | | | | 0.005 | 0.011 |
| $2 m_f \pm 1$ | 0.116 | 0.200 | 0.227 | 0.192 | 0.111 |
| $2 m_f \pm 5$ | | | | 0.008 | 0.020 |
| $3 m_f \pm 2$ | 0.027 | 0.085 | 0.124 | 0.108 | 0.038 |
| $3 m_f \pm 4$ | | 0.007 | 0.029 | 0.064 | 0.096 |
| $4 m_f \pm 1$ | 0.100 | 0.096 | 0.005 | 0.064 | 0.042 |
| $4 m_f \pm 5$ | | | 0.021 | 0.051 | 0.073 |
| $4 m_f \pm 7$ | | | | 0.010 | 0.030 |

In the linear PWM modulation mode, the peak amplitude of the sinewave fundamental frequency voltage increases proportionately with an increase in $m_a$ from 0 to 1. In the PWM over-modulation mode, the peak of the sinusoidal modulating signal exceeds the peak of the carrier signal. Thus, as a result, the quantity of PWM pulses begins to decrease and inverter output voltage increases. Unlike in the linear region, the sinewave fundamental frequency rms voltage component increases non-linearly with an increase in $m_a>1$ in the PWM over-modulation mode.

In the over-modulation region more significant sideband harmonics appear centered around the harmonic frequency $f_c$ and its multiples (e.g. $2f_c$, $3f_c$). However, the amplitudes of the dominant harmonics are not as large as in the $m_a<1$ region. For the purpose of this explanation operation in the linear mode will be assumed although a generalized harmonic voltage table similar to Table 1 could be generated which corresponds to overmodulating operation of the system.

Total harmonic distortion (THD) is a standard method of measuring the amount of harmonic distortion which occurs in a waveform. THD is defined as:

$$THD = 100 * \frac{\sqrt{\sum_{h=2}^{\infty} V_h^2}}{V_1} \quad \text{Eq. 6}$$

where $V_1$ is the RMS voltage at the fundamental frequency and $V_h$ is the RMS voltage at the harmonic frequency. Typically THD of an unfiltered PWM inverter output voltage is between 80% and 180% depending on operating speed. To cope with such excessive THD, the ASD industry specifies motors which will tolerate expected THD given a specific VSI. In other words motors are "inverter duty rated" such that, when linked directly to VSI outputs, the motors tolerate high THD and high frequency harmonic heating caused by unfiltered PWM output voltage pulses.

Unfortunately, in inverter duty rated motors which are supposed to be able to handle heating due to PWM harmonic distortion, unfiltered PWM output voltage pulses can cause motor winding electrical insulation failure. Thus, it is not surprising that inverter duty rated motor insulation failure is not solely related to high PWM THD. Instead, it has been found that such insulation failure is also directly related to steep fronted edges of the high-frequency square wave AC voltage pulses sent by VSIs down motor cable transmission lines to motor terminals.

For a given steep voltage pulse risetime, there is a cable length beyond which a transient voltage doubling (e.g., 2 per unit or 2 pu) of the original square wave voltage peak occurs at load terminals. This voltage doubling has been referred to as "classical transmission line effect" or "reflected wave voltage spikes". Present VSI output voltage waveforms have pulse risetime of approximately 100 nanoseconds to the DC bus voltage and as such have caused transient reflected wave voltage spikes at motor terminals for motor cable distances as short as 50 feet. As inverter-to-motor cable length is increased to 500 feet, reflected wave voltage spikes at the motor terminals have been observed to further increase to 3 to 4 pu magnitudes due to complex pulsed wave interactions between the cables and motor.

Unfiltered PWM voltage pulses applied to cables beyond 1000 ft. may have another voltage doubling effect, leading to 6 to 8 pu reflected wave voltage spikes at motor terminals. The >2 pu voltage spikes occurring at high frequency repetition are similar in magnitude to lightning strike and quickly degrade motor winding insulation.

In addition to overvoltages, the steep front edges of unfiltered PWM voltage pulses can cause line-to-ground electrical noise which in turn causes electromagnetic interference with sensitive electronic equipment resulting in equipment malfunction. This noise, sometimes referred to as "common mode" noise, is caused by high dv/dt of the PWM pulse edges interacting with line-to-cable cable capacitance and inherent motor stator winding line-to-ground capacitance.

To cope with reflected wave voltage spikes the industry has come up with several solutions, each of which has one or more shortcomings. A first solution includes software which is used to control an ASD in a manner calculated to reduce 3 to 4 pu motor transient reflected wave voltage spikes down to a classical 2 pu transmission line problem for long cable distances. U.S. Pat. No. 5,671,130 (hereinafter "the '130 reference") which is entitled "Method and Apparatus for Controlling Voltage Reflections using a Motor Controller" which issued on Sep. 23, 1997 discloses how the voltage spike problem is essentially eliminated by altering output pulse spacing using a VSI PWM controller while leaving PWM pulse edges and fundamental voltage unaltered. In conjunction with inverter duty motor insulation specified for repetitive voltage spikes, the robust '130 reference solution is viable for cable lengths up to 800 feet.

A second solution includes hardware mounted at motor terminals which reduces reflected wave voltage spikes to as low as 1 pu for cable lengths less than 1000 feet. U.S. Pat. No. 5,831,410 (hereinafter "the '410 reference") entitled "Apparatus Used with AC Motors for Eliminating Line Voltage Reflections" which issued on Nov. 3, 1998 discloses how reflected wave voltage spikes are reduced with specially designed cable impedance matching hardware mounted in parallel with cable leads adjacent a motor. With cable lengths less than 1000 feet the '410 reference solution leaves PWM fundamental voltage and PWM pulse edges essentially unaltered.

A third solution includes hardware mounted at VSI output terminals which reduces transient reflected wave voltage spikes to as low as 1pu for cable lengths up to 1000 feet. U.S. patent application Ser. No. 09/010,454 (hereinafter "the '454 reference") which is entitled "Apparatus For Eliminating Motor Voltage Reflections and Reducing EMI Currents" and which was filed on Jan. 21, 1996 discloses how reflected wave voltage spikes are reduced with specially designed cable impedance matching hardware mounted in series with the cable leads at ASD outputs. The '454 reference solution leaves PWM fundamental voltage essentially unaltered (e.g., 0.2% voltage drop) and slows PWM pulse edge risetime.

While each of the solutions above can essentially eliminate overvoltage problems where cable lengths are less than 1000 feet, unfortunately, where cable lengths exceed 1000 feet, these solutions and other dv/dt limiting hardware solutions are not entirely effective. For example, beyond 1,000 ft. cable length the '130 reference solution often is not effective to eliminate 3 pu and 4 pu reflected wave magnitudes. Similarly, beyond 1000 feet cable lengths with the '140 and '454 reference solutions package watts losses increase and effectiveness decreases and motor overvoltage which exceeds 1.75 pu has been observed. Thus, a different solution is required beyond 1,000 ft. cable lengths. Other dv/dt limiting hardware solutions available that slow the unfiltered PWM pulse risetime are also generally ineffective at reducing the transient reflected wave voltage spikes at the motor terminals for cable lengths beyond 1,000 ft.

In addition, only the '454 reference provides an integrated hardware solution to eliminate voltage spikes at cable lengths less than 1000 feet as well as eliminate common mode noise (i.e., the '130 and '410 references do not address the common mode noise problem).

Referring to FIG. 1a, one solution for eliminating reflected wave voltage spikes and line-to-ground common mode noise in cable lengths greater than 1000 feet is to insert a conventional low pass sinewave filter 10 between the outputs of a PWM VSI 12 and transmission cables linked to a load (i.e., a motor) 14. In FIG. 1a filter 10 includes line inductors and capacitors in parallel with load 14. Resulting low dv/dt of the fundamental sinewave output insures the peak of the sinewave filter output voltage is virtually the same at motor terminals even if cable lengths are 10,000 feet or greater. In addition, resulting low dv/dt insures line-to-ground current is limited to the low peak amplitude associated with a 60 Hz charging current. Inductors and capacitors of FIG. 1a and parasitic resistance of the low pass filter are well documented having a cutoff frequency $f_{co}$ determined by inductor and capacitor values and −40 dB attenuation per decade beyond the cutoff frequency $f_{co}$.

To achieve sine waveform benefits, conventional low pass filter design dictates that $f_{co}$ be 10 times less than the switching rate $f_c$ of the VSI high-frequency pulse train so that the PWM harmonics associated with VSI output are attenuated by −40 dB. In addition, $f_{co}$ should be 10 times greater than the fundamental frequency to prevent phase shifts in the output voltage which cause system instability.

Although simple, the conventional low pass sinewave filter design of FIG. 1a has several disadvantages. First, to obtain low THD performance, the design of FIG. 1a requires a large output capacitor and thus large reactive current which must be supplied by the VSI at startup. The majority of VSI overload kVA capability thus circulates current in the filter while starving the current required by the load. This lack of current can result in unstable system operating conditions and load oscillations at startup with resultant shutdown of the drive system.

Second, to obtain low THD, the FIG. 1a design requires large reactive current in addition to the load current which must be supplied by the VSI. The required high current can drive the VSI into overload operation when the VSI is rated for the expected load requirements. A VSI overload self-protect feature then functions to disconnect the VSI from the load.

Third, to obtain low THD, the conventional filter design requires, in addition to the load, large reactive filter kVA at the fundamental frequency which must be supplied by the VSI. Thus, the FIG. 1 a low pass filter must use a significantly larger inverter rating for the same size load powered without a filter.

Referring to FIG. 1b, an active solution which is similar to the solution of FIG. 1a compensates for loss of load current which circulates in the filter capacitors. In addition to the inductors and capacitors of filter 10 (see FIG. 1a) solution 1b includes current sensors 16, 18 placed in two of the three filter capacitor branches and sensors 20, 22 on two of the cables which actively feed current information back to a PWM controller 24 to adjust VSI output current to a magnitude equal to the combined load/filter current component. In this manner the load oscillation disadvantage is minimized. However, since the basic filter design is similar to the design of FIG. 1a, the FIG. 1b design and FIG. 1a design share the second and third disadvantages described above.

Therefore, it would be advantageous to have an apparatus which, based on application specific THD, reduces THD and reflected voltage spikes to application acceptable levels without requiring excessive filter currents which starve a load and which essentially eliminates reflected wave voltage spikes in all cable lengths without requiring large and expensive components.

BRIEF SUMMARY OF THE INVENTION

The present invention can be used with both passive and dynamic loads and includes an apparatus positioned between a PWM VSI and the load which alters PWM output terminal voltages to essentially eliminate or, depending upon the application specific THD required, substantially and sufficiently reduce troublesome harmonics at the load. The net result is to produce an application acceptable sinewave quality voltage waveform with low THD at the apparatus output which is provided to the load. In addition, the inventive apparatus substantially reduces voltage spikes and essentially eliminated common mode noise without excessive filter current draw. In this regard, when compared to conventional low pass filter networks, the inventive apparatus advantageously has a significantly lower 60 Hz fundamental current component through the filter. For example, in one measured instance the inventive apparatus was observed to have 13 times less 60 Hz reactive current draw than a conventional low pass filter. Because the reactive current is relatively low, the size and cost of apparatus components when compared to the conventional low pass filter is substantially less.

In addition, lower apparatus kVA means that an inverter can be sized at or close to actual load ratings as compared to the inverter being severely de-rated as a result of conventional filter use. Moreover, the smaller filter capacitance values used when compared to conventional filter networks facilitate inherently faster transient response to a unit step function and result in fewer inverter overload trips. Furthermore, lower 60 Hz kVA, lower inventive filter in rush kVA and faster filter transient response facilitate relatively stable starting of high torque loads when compared to conventional filters where load current is starved by the filter circulating current which should be provided to the load.

Also, the inventive apparatus can be used with VSI outputs up to 400 Hz fundamental frequency.

The inventive apparatus includes three preferred embodiments which correspond to three distinct yet similar design methodologies. A first embodiment includes a design which provides output voltage waveforms having low ripple sinewave quality waveforms characterized by THD in the range of 2%–6%. A second embodiment includes a design which provides quasi-sinewave output voltage waveforms characterized by THD in the range of 10–20%. A third embodiment includes a design which provides output voltage waveforms of harmonic free sinewave quality characterized by THD in the range of less than 2%.

The basic inventive design methodology is to first identify and characterize the predominant PWM harmonics to be presented to the inventive apparatus which is also referred to hereinafter as a filter. An inventive filter circuit is then designed to selectively eliminate only those discrete harmonics deemed necessary to obtain the THD performance required at the filter output for a particular application. This is done with one or more resonant circuit configurations in parallel with the load with each resonant configuration frequency matched to a discrete harmonic which is to be eliminated. A series current limiting device inserted between the PWM VSI output and resonant circuit branches optimizes harmonic current to the VSI rated current capability. In this fashion, the inventive filter design concept is optimized and the benefits and advantages listed above are realized.

Thus, one object of the invention is to minimize THD in voltages provided to a load. Another object is to essentially eliminate voltage spikes on voltage supply cables independent of cable length. One other object is to achieve the aforementioned objects while minimizing the amount of current drawn by the required filter network. Another object is the achieve the aforementioned objects inexpensively and with relatively small components. Yet another object is to enable use of VSIs which are rated at or close to load ratings. Yet another object is to reduce common mode line to ground cable charging current spikes of long cables to a lower value associated with a sinewave voltage at the fundamental output frequency.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 13 is a graph illustrating filter attenuation in dB vs. frequency of the inventive filter apparatus of FIG. 9 with various resonant filter frequencies as compared to the conventional low pass filter configuration of FIG. 1a;

DETAILED DESCRIPTION OF THE INVENTION

Figure 1A:
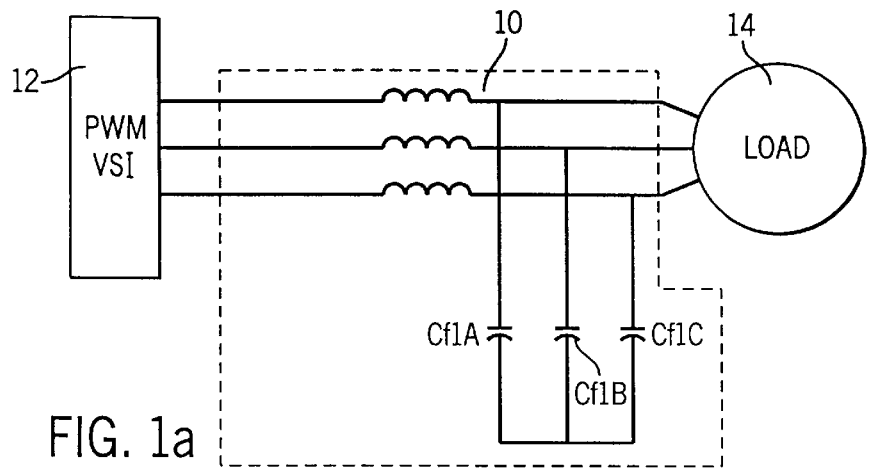
FIG. 1a is a schematic diagram of a conventional low pass inductor-capacitor sinewave filter apparatus linked to supply lines between a VSI and a load and FIG. 1b is a schematic diagram similar to FIG. 1a, albeit including a controller and current sensors which compensates for filter currents.
Figure 1B:
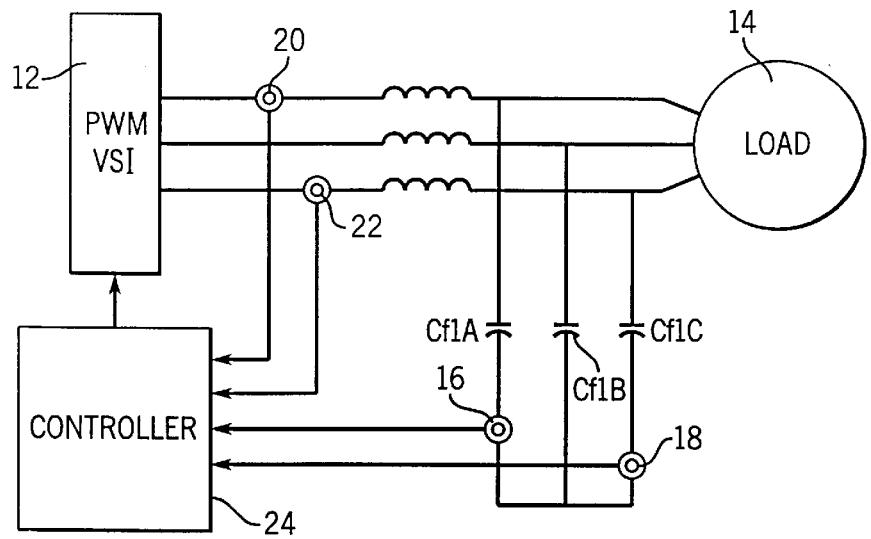

Referring now to the drawings, in the description which follows, like reference characters and numbers throughout the several views correspond to similar or identical components, signals, characteristics and the like.

A. Conceptual Development

Examination of Table 1 voltage harmonics generated at a VSI output show discrete packets of harmonics concentrated at the carrier frequency $f_c$ and its multiples $2f_c$, $3f_c$, $4f_c$, etc. The predominant PWM characteristic harmonics in the ($0<m_a<1.0$) region are centered at $2f_c$ and correspond to 0 to 52 Hz fundamental frequency operation for a typical 480 V 60 Hz inverter-motor system. In the ($0.6<m_a<1.0$) region, (i.e. 30 Hz to 52 Hz region), the harmonics centered at $f_c$ additionally become another significant harmonic source while harmonics at $f_c$ are relatively insignificant below $m_a<0.6$.

Figure 5:
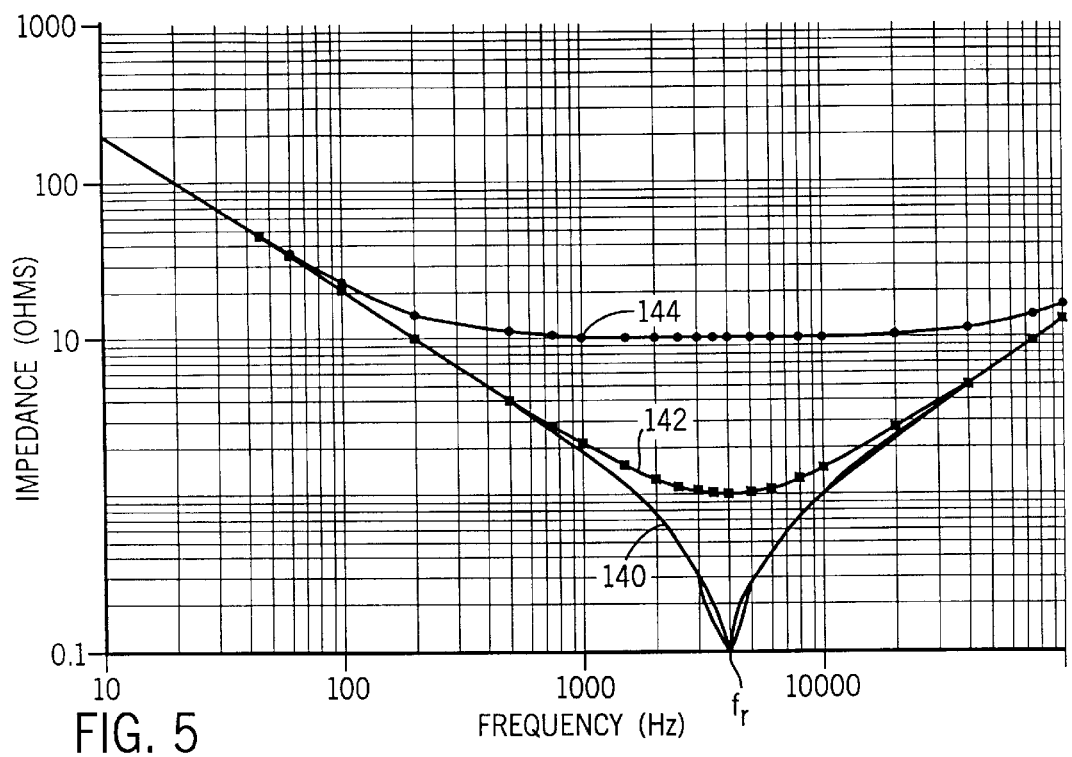
FIG. 5 is a graph illustrating impedance characteristics vs. frequency of a resistor, inductor and capacitor series circuit showing minimum circuit impedance at resonant frequency fr; increasing impedance dominated by the capacitor for frequencies<fr and increasing impedance dominated by the inductor for frequencies>fr for various resistor values.

Referring to FIG. 5, a graph illustrates total circuit impedance vs. frequency for a series circuit including a resistor R, an inductor L and a capacitor C assuming L=20 uh and C=80 uf for various resistor values R with a fundamental frequency of 60 Hz. The graph includes three waveforms 140, 142 and 144 corresponding to 0.1, 1 and 10 ohm resistor values, respectively. The resonant frequency $f_r$ point for the circuit is defined by the following equation:

$$f_r = \frac{1}{2\pi\sqrt{LC}} \qquad \text{EQ. 7}$$

and is 4 kHz.

Observing waveforms 140, 142 and 144 several things are evident. First, the total circuit impedance at $f_r$ is only limited by the series resistor R. Second, circuit impedance at frequencies below $f_r$ is dominated by capacitive reactance $X_c$ and the chosen resistor value. Third, for external forcing frequencies applied to the circuit that are above $f_r$ the capacitor is essentially a short circuit and circuit impedance is dominated by inductive reactance $X_L$ and the chosen resistor value.

Consider an ideal series resonant R-L-C circuit placed across a VSI terminal and in parallel with a load. If the R-L-C circuit resonant frequency $f_r$ is selectively set at $2f_c$, then from FIG. 5, there is minimum impedance to the current harmonics at $2f_c$ and currents at $2f_c$ flow in the low impedance filter branch rather than in the parallel load thereby improving the voltage THD. Also, consider a second ideal series resonant R-L-C circuit placed across the inverter terminals and in parallel with the load and in parallel with the first filter. If the second R-L-C circuit resonant frequency $f_r$ is selectively set at $f_c$, then from FIG. 5 there is minimum impedance to the current harmonics at $f_c$ and these currents at $f_c$ flow in the second low impedance filter branch rather than in the parallel load thereby further improving the load voltage THD.

Figure 6:
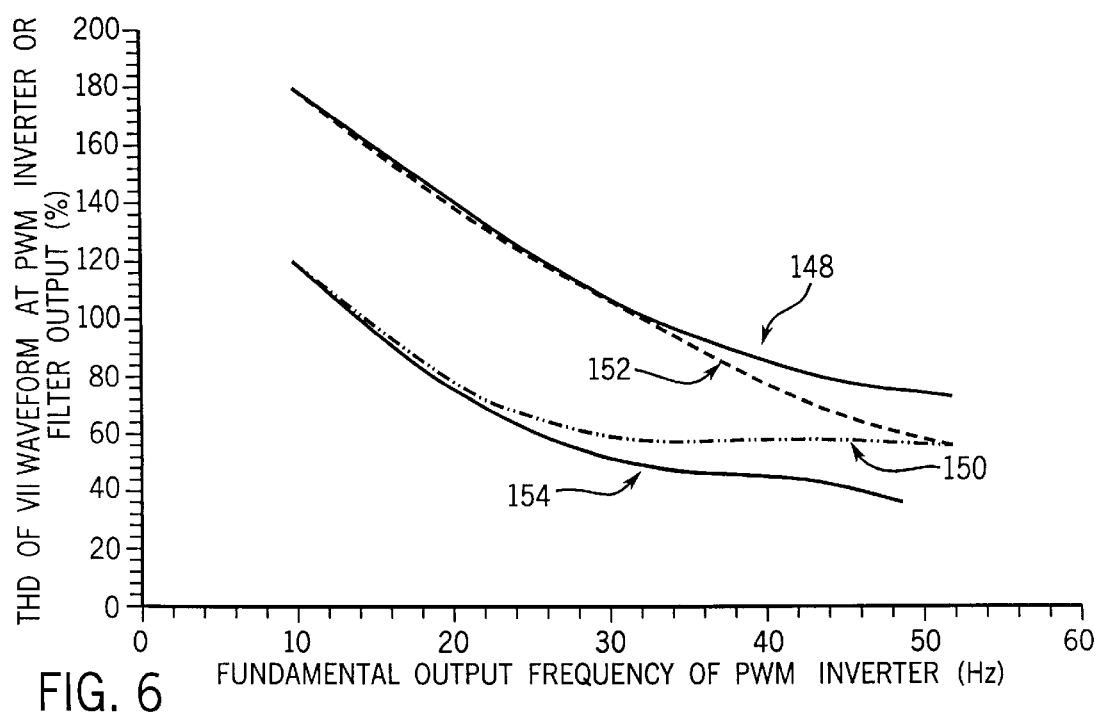
FIG. 6 is a graph illustrating THD of a conceptual idealized filter line-to-line output voltage vs. output frequency for various embodiments of the inventive filter design.

To illustrate the conceptual THD improvement possible at the load, three idealized filter cases were configured. The first case considered is a single ideal series resonant filter with $f_r$ selectively set at $2f_c$. Thus, the predominant $2f_c$ PWM voltage harmonics in Table 1 can be eliminated and the THD formula (e.g., Equation 6) can be re-calculated without the $2f_c$ PWM voltage harmonics. The results of this first case over the linear region of operation (i.e., $0<m_a<1.0$) are plotted in FIG. 6 as waveform 150.

The second case considered is a single ideal series resonant filter with $f_r$ selectively set at $f_c$. Thus, the dominant $f_c$ PWM voltage harmonics in Table 1 can be eliminated and the THD formula (i.e., Equation 6) can be re-calculated. Results of this case are indicated by waveform 152 over the linear operating region in FIG. 6.

The third case considered includes two parallel ideal series resonant filters at the inverter output, with $f_r$ of the first filter selectively set at $f_c$, and $f_r$ of the second filter selectively set at $2f_c$. Thus, the predominant $2f_c$ PWM voltage harmonics and dominant $f_c$ harmonics in Table 1 can both be eliminated and Equation 6 THD formula can be re-calculated. The results of this case are identified by waveform 154 in FIG. 6 over the linear operating region. For comparison, the THD for a circuit which does not include a filter are illustrated as waveform 148.

While the conceptual resonant R-L-C filter placed across the inverter output shows improved THD (compare waveforms 148, 150, 152, 154) the filter has several disadvantages. The first disadvantage is that unlimited current flows from the inverter at the discrete packets of harmonics concentrated at the carrier frequency $f_c$ and its multiples $2f_c$, $3f_c$, $4f_c$, etc., due to the lack of current limiting impedance. The high harmonic current will overload the inverter or cause a severe de-rating of allowable fundamental inverter output current. The series resistor of the resonant filter may be increased to provide current limiting but this has the disadvantage of increasing the THD value and also dissipating a large amount of harmonic power.

These disadvantages are overcome by including a current limiting element (e.g., a line inductor) in series between the filter configurations and the VSI as explained in more detail below.

B. Hardware

Figure 3:
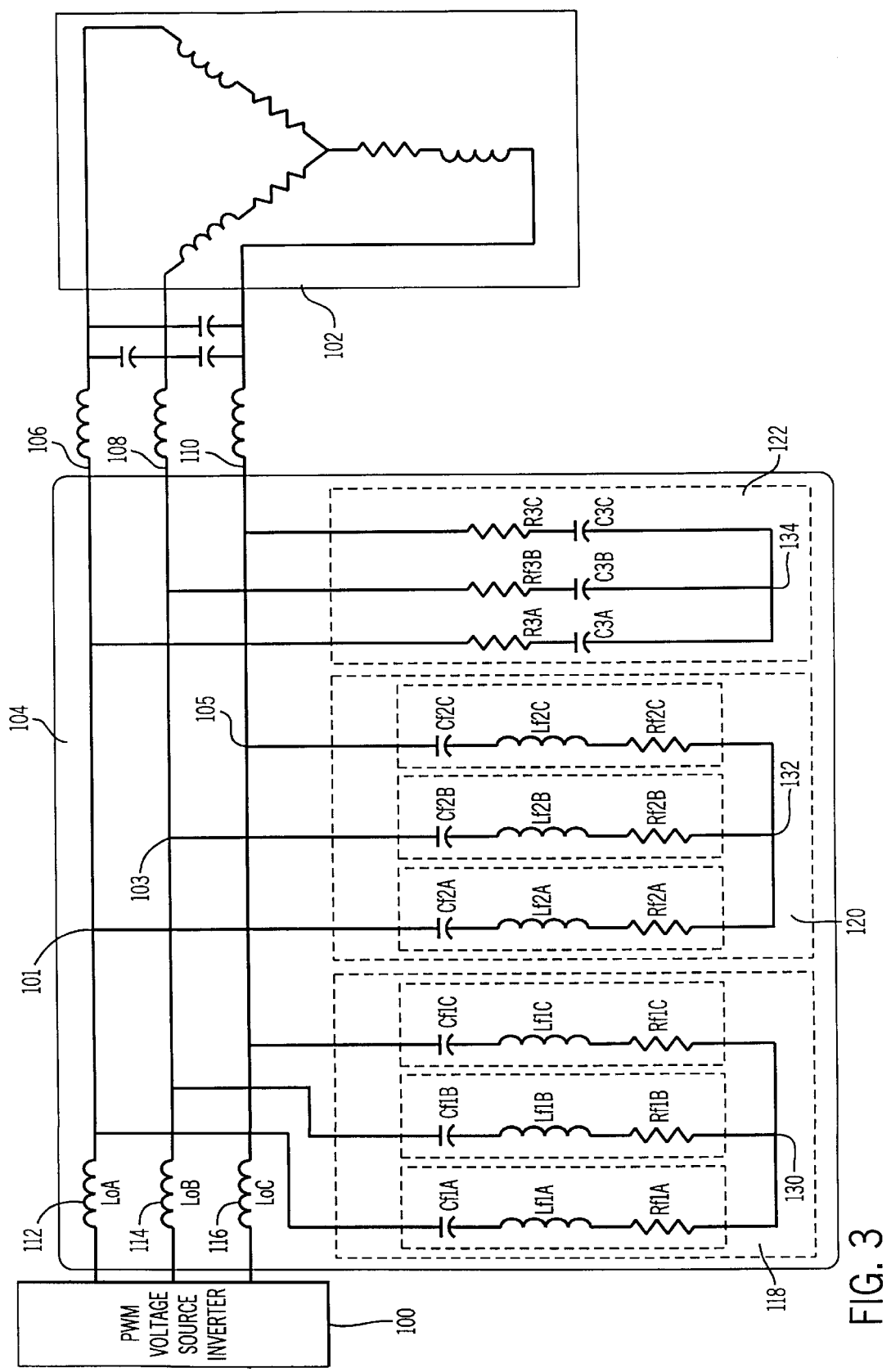
FIG. 3 is a schematic diagram of the basic topology of a preferred inventive filter apparatus linked between a VSI and a load.

FIG. 3 shows the basic topology of an inventive three phase series resonant sinewave output filter apparatus 104 linked to first, second and third supply lines or voltage cables 106, 108 and 110 between a PWM Voltage Source Inverter (VSI) 100 and a three phase load 102 which may be a passive resistor/inductor load or the three phase stator winding of an AC induction motor. Cables 106, 108 and 110 are illustrated as a three phase representation consisting of per phase inductance and line-to-line capacitance.

Figure 2:
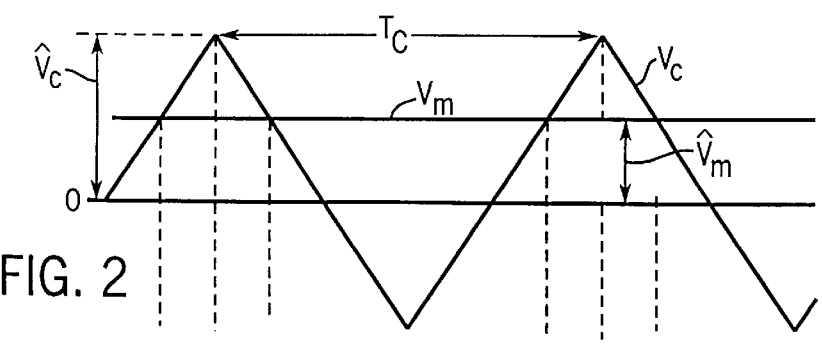
FIG. 2 is a graph illustrating exemplary modulating and carrier signals used by a PWM VSI to produce high frequency voltage pulses.

VSI 100 provides a variable frequency variable voltage component that transfers power at a fundamental frequency $f_1$ to filter apparatus 104. The VSI output also contains voltage harmonics $V_h$ centered at the carrier frequency $f_c$ and its multiples (e.g., $2f_c$, $3f_c$, $4f_c$). The carrier frequency for present day VSI using Insulated Gate Bipolar Transistor (IGBT) semiconductors as the inverter switching elements ranges from 1 kHz to 10 kHz depending on power levels. Carrier frequency voltage amplitudes are defined in Table 1 for Sinusoidal PWM using comparison techniques of a sinewave modulating signal $V_m$ and triangle-wave carrier signal $V_c$ (see FIG. 2). VSI inverters using other modulators can be used with the inventive filter as long as the output harmonics are defined for the operating conditions. It is important to define the harmonic voltage amplitudes at the VSI outputs as filter design is preferably accomplished using frequency domain analysis.

Filter 104 consists of first, second and third output line inductors 112, 114 and 116, respectively, first and second resonant filter configurations 118 and 120 and a resistor-capacitor by-pass filter configuration 122 to filter high harmonic frequencies. Output inductors $L_{OA}$, $L_{OB}$, and $L_{OC}$ (i.e., 112, 114 and 116) are inserted in series with the VSI output phases between the VSI 100 and filter configurations 118, 120 and 122 with inductor input terminals linked to VSI 100 and line inductor output terminals 101, 103 and 105 linked to voltage supply cables 106, 108 and 110.

Inductors 112, 114 and 116 are chosen to limit the high frequency harmonic current into the series resonant filter configurations to within the inverter current rating. In addition, values of inductors 112, 114 and 116 are also chosen to simultaneously minimize the inductor component voltage drops due to rated current flowing at fundamental frequency $f_1$.

Filter configuration 118 includes three separate phase branches A, B and C, each branch A, B and C is linked to a separate one of the inductors 112, 114 and 116, respectively. Phase A of configuration 118 consists of series connected resistor $R_{f1A}$, inductor $L_{f1A}$ and capacitor $C_{f1A}$ which link line terminal 101 to a wye neutral connection point or first common node 130. Capacitor $C_{f1A}$ is linked to terminal 101 while resistor $R_{f1A}$ is linked to node 130. Similarly, phase B of configuration 118 consists of series connected resistor $R_{f1B}$, inductor $L_{f1B}$ and capacitor $C_{f1B}$ linked between terminal 103 and common node 130 while phase C of configuration 118 consists of series connected resistor $R_{f1C}$, inductor $L_{f1C}$ and capacitor $C_{f1C}$ linked between terminal 105 and common node 130 with capacitors $C_{f1B}$ and $C_{f1C}$ linked to terminals 103 and 105, respectively, and resistors $R_{f1B}$ and $R_{f1c}$ linked to common node 130.

Configuration 120 is similar to configuration 118 in design, linkage and function. To this end, configuration 120 includes three separate phase branches A, B and C, each phase A, B and C linked to a separate one of terminals 101, 103 and 105, respectively. Phase A of configuration 120 consists of series connected resistor $Rf_{2A}$, inductor $L_{f2A}$ and capacitor $C_{f2A}$ which link terminal 101 to a wye neutral connection point or second common node 132. Terminal 101 is connected to phase A of configuration 120 through connection to capacitor $C_{f2A}$ while resistor $R_{f2A}$ is linked to node 132. Similarly, phase B of configuration 120 consists of series connected resistor $R_{f2B}$, inductor $L_{f2B}$ and capacitor $C_{f2B}$ linked between terminal 103 and common node 132 while phase C of configuration 120 consists of series connected resistor $R_{f2C}$, inductor $L_{f2C}$ and capacitor $C_{f2C}$ linked between an terminal 105 and common node 132.

Three phase high frequency bypass filter configuration 122 also includes three phase branches A, B and C and is connected to terminals 101, 103 and 105 in a manner similar to that of configurations 118 and 120. To this end, phase A of configuration 122 consists of a series connection including a resistor $R_{f3A}$ and a capacitor $C_{f3A}$. Terminal 101 is connected to phase A of configuration 122 through connection to resistor $R_{f3A}$. Capacity $C_{f3A}$ is connected to a wye neutral connection point or third common node 134 which corresponds to configuration 122. Similarly phase B of configuration 122 consists of a series connection including a resistor $R_{f3B}$ and a capacitor $C_{f3B}$. Terminal 103 is connected to phase B of configuration 122 through connection to resistor $R_{f3B}$ and capacitor $C_{f3B}$ iS linked to common node 134. Phase C of configuration 122 consists of a series connection including a resistor $R_{f3C}$ and a capacitor $C_{f3C}$. Terminal 105 is connected to phase C of configuration 122 through connection to resistor $R_{f3C}$ and capacity $C_{f3C}$ is linked to common node 134.

Filter 104 is designed to limit load THD values at levels comparable to that obtained with a conventional low pass inductor-capacitor sinewave filter configuration while being physically smaller in size, lower in output capacitor cost, and having a faster dynamic step response.

The selective harmonic elimination feature of the filter parallel branches also enables the VSI to transmit fundamental variable frequency power over very long output cable distances (e.g. 20,000 ft.) to the load, without the reflected wave voltage and common mode cable charging current problems associated with steep fronted VSI voltage pulses. These advantages are accomplished by optimally and selectively eliminating only the troublesome VSI harmonics and converting the VSI pulsed voltage waveform into a quasi-sinusoidal waveform with only enough dv/dt ripple voltage to prevent reflected wave voltage problems at the load.

C. Circuit Operation

Figure 4:
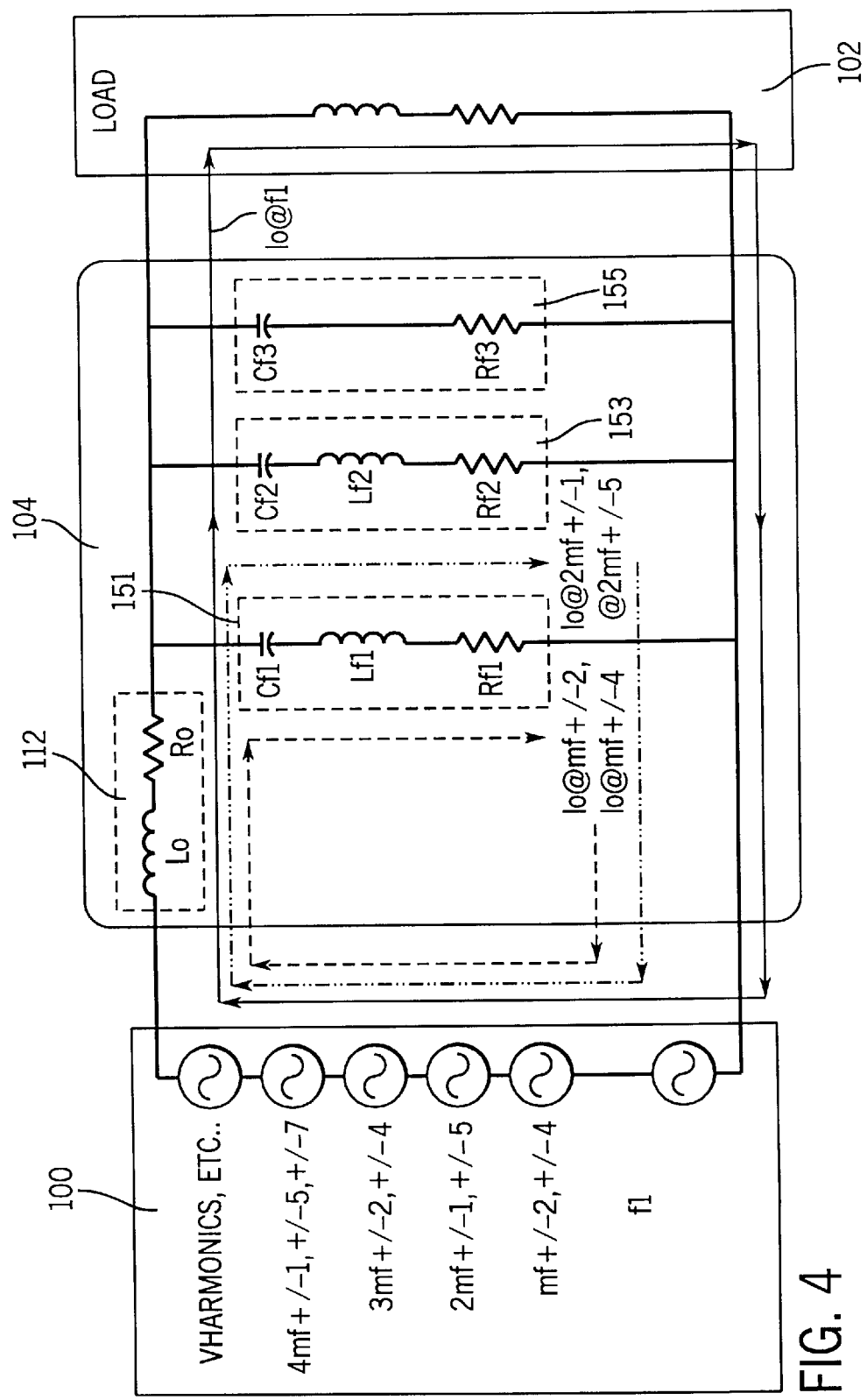
FIG. 4 is a per-phase equivalent circuit schematic representation of the inventive apparatus of FIG. 3.

Referring now to FIG. 4, a per phase equivalent circuit representation for phase A of the three phase circuit of FIG. 3 is illustrated. The per phase circuit includes line inductor Lo and resistor Ro which correspond to line inductor 112 (see FIG. 3) and all of the phase A resistors, capacitors and inductors corresponding to configurations 118, 120 and 122. Branches 151, 153 and 155 correspond to configurations 118, 120 and 122, respectively.

The PWM VSI output pulses are represented by a fundamental line-to-neutral sinewave voltage component centered at fundamental frequency $f_1$ and a series connection of line-to-neutral sinewave voltage harmonic sidebands centered at the carrier frequency $f_c$ and its multiples $2f_c$, $3f_c$, and $4f_c$. These pulses are represented as series voltage sources in VSI 100. The line-to-neutral voltage harmonic amplitudes for a given modulation index operating condition may be obtained using Table 1 line-to-line voltage harmonic amplitudes and dividing by $\sqrt{3}$. As seen in Table 1, the predominant harmonics of the VSI over the 0 Hz to 60 Hz fundamental frequency range are centered at $2f_c$ sidebands. VSI output voltage harmonics centered at the carrier frequency $f_c$ sidebands are not significant until the fundamental frequency is greater than 30 Hz. VSI output voltage harmonic amplitudes for frequencies greater than $4f_c$ are not considered significant and are therefore not discussed.

To obtain a sinewave quality output voltage across load 102 over the 0 to 60 Hz fundamental frequency range usually requires a minimum of two series resonant filter configurations in parallel with the load as in FIGS. 3 and 4. One filter is for eliminating the effects of voltage harmonics centered at the carrier frequency $f_c$ and the other configuration is for eliminating the effects of harmonics at twice the carrier frequency $2f_c$.

In FIG. 4, the resonant frequency $f_{r1}$ of branch 151 is determined by solving Equation 7:

$$f_r = \frac{1}{2\pi\sqrt{LC}} \quad \text{Eq. 7}$$

with $L=L_{f1}$, $C=C_{f1}$, and is selectively set to be equal to carrier frequency $f_c$. Thus, branch 151 provides minimum shunt impedance, limited only by $R_{f1}$, as compared to the resistance and inductance impedance of the load at carrier frequency $f_c$. As a result, FIG. 4 shows VSI output voltage harmonics centered at carrier frequency $f_c$ ($f_c \pm 2f_m$, $f_c \pm 4f_m$) will cause the majority of harmonic current (Io@$m_f$) to circulate from the VSI inverter output through filter inductor Lo, through the low impedance path of the series $C_{f1}$, $L_{f1}$, and $R_{f1}$ back to the VSI output.

Output filter inductor Lo is the primary component that limits harmoniccurrent through branch 151 for frequencies near frequency $f_c$. Resistor $R_{f1}$ functions as a damping resistor to prevent resonant peaking voltages but may also function to limit current at the circuit resonant frequency. Resistor $R_{f1}$ does have a negative effect on the load total harmonic distortion value if a high resistance value is selected. Ideally, for low distortion, the value of $R_{f1}$ should be <1% of the load impedance at frequency $f_c$ to maintain effective low shunt impedance of branch 151 at frequency $f_{r1}$. Since inductor Lo is the primary current limiting component at frequency $f_c$ for $C_{f1}$ and $L_{f1}$, it is possible to have successful circuit operation with resistor $R_{f1}$=0 ohms. This minimizes power dissipation and decreases load THD value, but must be analyzed for system resonant peaks.

Referring still to FIG. 4, the resonant frequency $f_{r2}$ of branch 153 is determined by solving Equation 7 with L=$L_{f2}$, C=$C_{f2}$ and is selectively set to be equal to carrier frequency $2f_c$. Thus, branch 153 provides minimum shunt impedance limited only by $R_{f2}$ as compared to the resistance and inductance impedance of the load at the carrier frequency $2f_c$. As a result, FIG. 4 shows VSI output voltage harmonics centered at harmonic frequency $2f_c$ (i.e., $2f_c \pm 1$, $2f_c \pm 5f_m$) will cause the majority of harmonic current (lo@2$m_f$) to circulate from the VSI output through filter inductor Lo, through the low impedance path of the series $C_{f2}$, $L_{f2}$ and $R_{f2}$ back to the VSI output.

Once again, output filter inductor Lo is the primary component which limits harmonic current through the low impedance configuration 120 for frequencies near frequency $2f_c$. Resistor $R_{f2}$ functions as a damping resistor to prevent resonant peaking voltages but may also function to limit current at the circuit resonant frequency. Resistor $R_{f2}$ has a negative effect on the load total harmonic distortion value if a high resistance value is selected. Ideally, for low distortion, the value of $R_{f2}$ should be less than 1% of the load impedance at harmonic frequency $2f_c$ to maintain effective low shunt impedance of configuration 120 at $f_{r2}$. Since output inductor Lo is the primary current limiting component at frequency $2f_c$ for $C_{f2}$ and $L_{f2}$, it is possible to have successful circuit operation with resistor $R_{f2}$=0 ohms. This minimizes power dissipation and decreases load THD values, but must be analyzed for system resonant peaks.

The impedance of both branches 151 and 153 at the VSI fundamental output frequency $f_1$ is very high. Similar to the series resonant impedance characteristic curves of FIG. 5, capacitors $C_{f1}$ and $C_{f2}$ largely determine the high impedance characteristic of their respective series resonant filter branch impedance magnitudes at frequency $f_1$ which is a frequency well below resonant filter frequencies $f_{r1}$ and $f_{r2}$.

Thus, the majority of fundamental current flow (lo@f1 in FIG. 4) from the VSI output is passed to the load without diversion into the filter branches. This is a significant advantage of the inventive circuit over the conventional L-C low pass filter, since the inverter rated output current does not have to be severely derated due to insertion of an output filter. It will be subsequently shown that the inverter filter capacitor kVA rating is substantially lower than that of a conventional low pass filter for the same output voltage and THD requirement of the load.

Figure 7:
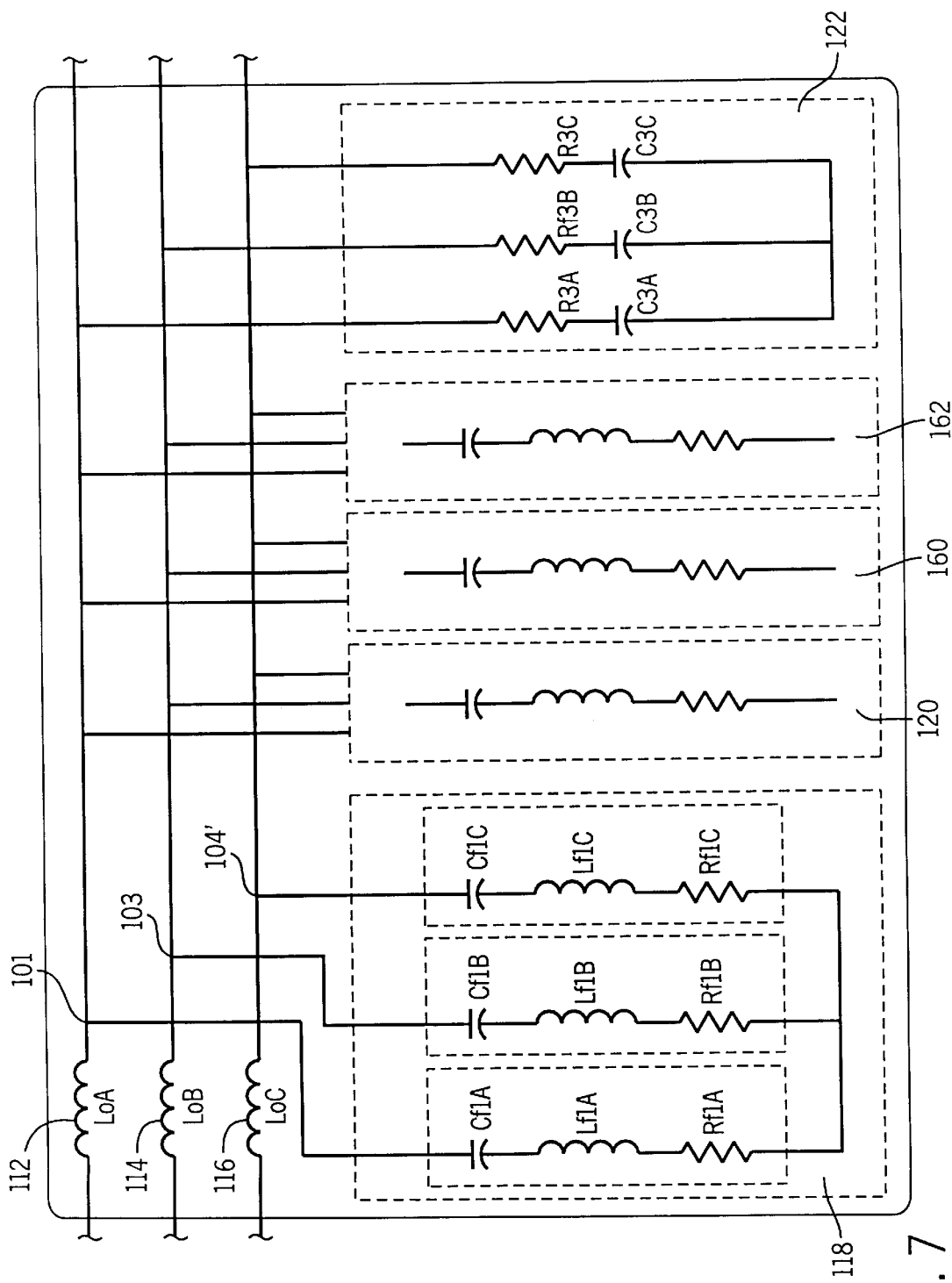
FIG. 7 is a schematic diagram of a second embodiment of the present invention which is similar to the embodiment of FIG. 3, albeit including additional filter configurations.

Referring to FIG. 7, a second preferred filter apparatus 104' is illustrated. Apparatus 104' obtains a superior sinewave quality output voltage across the load over the 0 to 60 Hz fundamental frequency range. To this end, apparatus 104' is identical to filter apparatus 104 (see FIG. 3) except that apparatus 104' includes two additional series resonant filter configurations 160, 162 in parallel with the load (not illustrated). In FIG. 7, configuration 118 is shown in full while configurations 120 and 122 are shown in an abbreviated form. Similarly, although configurations 160 and 162 are shown in abbreviated form, each of configurations 160 and 162 is constructed like configuration 118 and includes three branches linked between nodes 101, 103 and 105 and configuration specific common nodes wherein each branch includes a series arranged capacitor, resistor and inductor.

The inductors and capacitors in configurations 160 and 162 are selected using the methodology described above and such that the resonant frequencies of the configurations are at other troublesome harmonic frequencies. Thus, configurations 160 and 162 additionally eliminate the effects of VSI voltage harmonics centered at $3f_c$ (i.e., $3f_c \pm 2f_m$, $3f_c \pm 4f_m$) and $4f_c$ (i.e, $4f_c \pm f_m$, $4f_c \pm 5f_m$, $4f_c \pm 7f_m$)

While apparatus of FIG. 7 is possible, it may not be necessary in many cases since the VSI $3f_c$ and $4f_c$ voltage harmonic amplitudes are not as significant as those at $f_c$ and $2f_c$ (see Table 1). In addition, it will be shown below that the use of $f_c$ and $2f_c$ series resonant configurations alone attenuate the VSI $3f_c$ and $4f_c$ voltage harmonics to acceptable levels for most applications.

Refer once again to FIGS. 3 and 4, configuration 122 is optional. Configuration 122 can be designed to smooth the high frequency ringing voltage across the load over the 0 to 60 Hz fundamental frequency range. In lieu of adding parallel branches of series resonant filters to eliminate VSI voltage harmonics centered at the $3f_c$ and $4f_c$ as described in the preceding paragraph, configuration 122 functions as a conventional low pass filter with a very high resonant cut-off frequency determined by Equation 7 with L=Lo and C=$C_{f3}$ (see FIG. 4).

The value of Lo is constrained and fixed by fundamental voltage drop concerns and limiting harmonic ripple current to within inverter ratings. One selection option for configuration 122 is to choose capacitor $C_{f3}$ for a resonant frequency peak between $2f_c$ and $3f_c$, where a PWM excitation source does not exist. Resistor $R_{f3}$ is chosen to minimize THD and minimize power loss. However, another selection option for configuration 122 is to choose capacitor $C_{f3}$ to attenuate only the ultra-high frequency components appearing at the load as a result of the VSI steep fronted pulse risetime. Configuration 122 is useful in attenuating the ultra-high frequency component due to the PWM VSI output pulse risetime which is dictated by the semiconductor switch risetime to the dc bus level in the inverter. Fourier analysis of the PWM pulse risetime to the DC bus shows an ultra-high frequency component defined by the following equation:

$$f_u = \frac{1}{\pi t_{rise}} \qquad \text{Eq. 8}$$

For IGBT semiconductor risetimes of 100 NS to 400 NS, this translates to frequencies of 800 kHz to 3.2 Mhz. The R-C function of configuration 122 is beneficial in attenuating the fu frequencies, since the $2f_c$ and $3f_c$ series resonant filters will not totally attenuate these frequencies.

Figure 8:
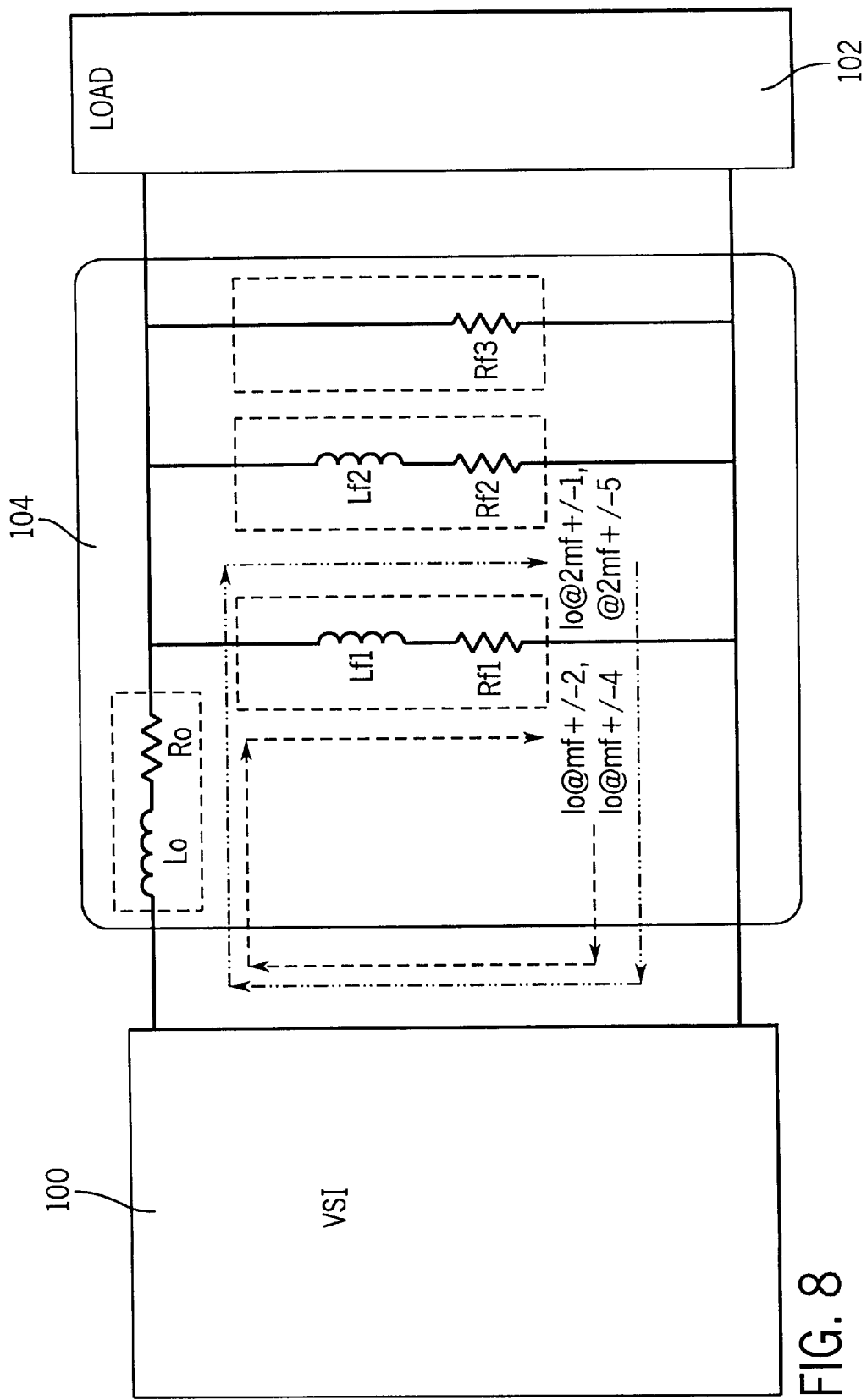
FIG. 8 is a high frequency per phase equivalent circuit schematic corresponding to FIGS. 3 and 4.

FIG. 8 is a per phase high frequency equivalent circuit representation of the circuit of FIG. 4. FIG. 5 shows that impedance characteristics of the series resonant circuit above resonant point $f_r$ are dominated by the series inductor and resistor. This implies capacitor $C_{f1}$ of configuration 118 is essentially a short circuit to inverter harmonic frequencies which are well above the $f_{r1}$=$f_c$ resonant point. The high frequency equivalent circuit above $f_{r1}$ then defaults to an inductor $L_{f1}$ and series resistor $R_{f1}$ as illustrated in FIG. 8. Thus, PWM inverter harmonic frequencies above $f_c$, specifically $2f_c$, $3f_c$, $4f_c$, etc . . . , as well as $f_u$, are still attenuated through voltage divider action in FIG. 8 between $L_{f1}$ and output inductor Lo, assuming $R_{f1}$ is small in value or zero ohms. Likewise, capacitor $C_{f2}$ is essentially a short circuit to inverter harmonic frequencies that are well above the $fr_2=2f_c$ resonant point. The high frequency equivalent circuit above $2f_c$ then defaults to an inductor $L_{f2}$ and series resistor $R_{f2}$ as illustrated in FIG. 8. Thus, PWM inverter harmonic frequencies above $2f_c$, specifically $3f_c$ and $4f_c$, etc . . . , as well as $f_u$, are still attenuated, but through voltage divider action in FIG. 8 between inductor $L_{f2}$ and output inductor Lo, assuming $R_{f2}$ is small in value or zero ohms. Thus, for inverter harmonic frequencies above $2f_c$ and small or zero values of $R_{f1}$, or $R_{f2}$, the inventive filter attenuation using the two resonant filter branches described is independent of frequency and defined by the following equation:
filter attenuation above $$2f_c = -20\text{LOG}\left(\frac{L_{parallel}}{L_0 + L_{parallel}}\right) \text{ (dB)} \qquad \text{Eq. 9}$$

where $$L_{parallel} = \left[\frac{L_{f1} \cdot L_{f2}}{L_{f1} + L_{f2}}\right].$$

In order for configuration 122 to beneficial in further reducing the harmonic voltage content to the load at high harmonic frequencies $f_h$, it can be inferred from FIG. 8 that the maximum value of $R_{f3}$ must be less than $2\pi f_h L_{parallel}$.

Prior to a discussion of alternate preferred inventive configurations it is helpful to fully understand the mathematical description of the basic inventive filter topology illustrated in of FIGS. 3 and 4.

C. Mathematical Development

The purpose of the following section is to define the inventive filter attenuation vs. frequency characteristic, determine the rms harmonic current through the filter branches and calculate filter watts loss for efficiency determination. The per phase equivalent circuit of FIG. 4 is used as a reference diagram. The inventive filter branches are split into basic circuit functions, and then mathematically assembled to derive the overall filter performance equations.

The output line inductor is considered the first filter component and has an equivalent inductance Lo and a series winding resistance component Ro. The impedance is thus Zo at a phase $\theta_o$ determined by EQ.10.

$$Z_0 = \|Z_0\| \angle \theta_0 \qquad \text{Eq. 10}$$

where $\|Z_0\| = \sqrt{(R_0)^2 + (\omega L_0)^2}$

AND $\theta_0 = \angle \tan^{-1}\left\{\frac{(\omega L_0)}{R_0}\right\}$

The impedance $Z_1$ and phase angel $\theta_1$, of the resonant branch 151 are defined by the standard $2^{nd}$ order R-L-C equation:

$$Z_1 = \|Z_1\| \angle \theta_1 \qquad \text{Eq. 11}$$

where $\|Z_1\| = \sqrt{(R_{f1})^2 + \left(\omega L_{f1} - \frac{1}{\omega C_{f1}}\right)^2}$ AND $\theta_1 = \angle \tan^{-1}\left\{\frac{\left(\omega L_{f1} - \frac{1}{\omega}C_{f1}\right)}{R_{f1}}\right\}$ where $f_{resonance(filter1)} = \frac{1}{2\pi\sqrt{L_{f1}C_{f1}}}$ Similarly, the impedance $Z_2$ and phase angel $\theta_2$ of resonant branch 153 are defined by the standard $2^{nd}$ order R-L-C equation:

$$Z_2 = \|Z_2\| \angle \theta_2 \qquad \text{Eq. 12}$$

where $\|Z_2\| = \sqrt{(R_{f2})^2 + \left(\omega L_{f2} - \frac{2}{\omega C_{f2}}\right)^2}$ AND $\theta_2 = \angle \tan^{-1}\left\{\frac{\left(\omega L_{f2} - \frac{2}{\omega C_{f2}}\right)}{R_{f2}}\right\}$ where $f_{resonance(filter2)} = \frac{2}{2\pi\sqrt{L_{f2}C_{f2}}}$ $Z_p$ is defined as the impedance of the parallel combination of the resonant filter branches 151 and 153 as:

$$Z_p = \|Z_p\| \angle \theta_p \qquad \text{Eq. 13}$$

where the following equations are true:

$$Z_p = \frac{Z_1 \cdot Z_2}{Z_1 + Z_2} = \frac{\|Z_1\| \angle \theta_1 \cdot \|Z_2\| \angle \theta_2}{\|Z_1\| \angle \theta_1 + \|Z_2\| \angle \theta_2}$$

$$Z_p = \frac{\|Z_1\| \|Z_2\| \angle (\theta_1 + \theta_2)}{\sqrt{(R_{f1} + R_{f2})^2 + \left(\omega L_{f1} + \omega L_{f2} - \frac{1}{\omega C_{f1}} - \frac{1}{\omega C_{f2}}\right)^2}} \angle \tan^{-1}\left\{\frac{\left(\omega L_{f1} + \omega L_{f2} - \frac{1}{\omega C_{f1}} - \frac{1}{\omega C_{f2}}\right)}{(R_{f1} + R_{f2})}\right\}$$

so that the total parallel impedance equation is defined by:

$$Z_p = \|Z_p\| \angle \theta_p$$

where $$\|Z_p\| = \frac{\|Z_1\| \|Z_2\|}{\sqrt{(R_{f1} + R_{f2})^2 + \left(\omega L_{f1} + \omega L_{f1} - \frac{1}{\omega C_{f1}} - \frac{1}{\omega C_{f2}}\right)^2}}$$

where

-continued $$L\theta_p = L\left((\theta_1 + \theta_2) - \tan^{-1}\left\{\frac{\left(\omega L_{f1} + \omega L_{f2} - \frac{2}{\omega C_{f1}} - \frac{2}{\omega C_{f2}}\right)}{(R_{f1} + R_{f2})}\right\}\right)$$

As described in a perfunctory manner above, filter input-to-output attenuation is caused by impedance divider action between the parallel impedance $Z_p$ of series resonant filter branches 151 and 153 and harmonic current limiting output impedance $Z_o$.

Filter input voltage from the VSI has voltage components of various magnitudes at the fundamental frequency component $f_{f1}$, sidebands near the carrier frequency $f_c$ and multiples of the carrier frequency harmonics $2f_c$, $3f_c$, $4f_c$ and higher. The modulation voltage Vmodutation thus comprises the combined voltages at each of these frequencies. Filter line-to-neutral input harmonic voltage input $V_{in}$ is determined by the following equation:

$$V_{in} = V_{modulation(fo,fc)} \frac{Vbus}{\sqrt{3}}$$ Eq. 14 which makes use of Table 1 per unit PWM line-to-line harmonic voltages $V_{modulation}$ which correspond to the PWM fundamental frequency operating condition.

Filter output voltage $V_{out}$ is obtained from the impedance divider action described by the following equation:

$$V_{out} = V_{in} \frac{\|Z_p\| L\theta_p}{\|Z_0\| L\theta_0 + \|Z_p\| L\theta_p}$$ Eq. 15

A filter attenuation ratio (i.e., filter output voltage/filter input voltage) is thus defined by the equation:

$$\left\|\left(\frac{V_{out}}{V_{in}}\right)\right\| = \frac{\|Z_p\|}{\sqrt{(R_0 + Z_p\cos(\theta_p))^2 + (\omega L_0 + Z_p\sin(\theta_p))^2}}$$ Eq. 16 and the filter attenuation ratio (in dB) vs. frequency is thus determined by equation:

$$A = 20\log\left(\frac{V_{out}}{V_{in}}\right)$$ Eq. 17

$$= 20\log\left(\frac{\|Z_p\|}{\sqrt{(R_0 + Z_p\cos(\theta_p))^2 + (\omega L_0 + Z_p\sin(\theta_p))^2}}\right)$$

Total harmonic current into the filter is a result of harmonic voltages applied to the input and is limited by the total filter impedance $Z_T$ which is the vector sum of Zo with the parallel impedance combination $Z_p$ and is expressed as:

$$\|Z_T\| = \sqrt{(R_0 + Z_p\cos(\theta_p))^2 + (\omega L_0 + Z_p\sin(\theta_p))^2}$$ Eq. 18

For a given fundamental operating frequency, the harmonic current passing though the filter current limiting inductor Lo at each harmonic frequency $f_h$ is:

$$I_o(f_m, f_h) = \frac{V_{in}}{\|ZT\|}$$ Eq. 19 the harmonic current passing through resonant filter branch 151 at each harmonic frequency is:

$$I_1(f_m, f_h) = \frac{V_{out}}{\|Z1\|}$$ Eq. 20 and harmonic current passing through resonant filter branch 153 at each harmonic frequency is:

$$I_2(f_m, f_h) = \frac{V_{out}}{\|Z2\|}$$ Eq. 21

The rms harmonic current is defined as the square root of the sum of the squares of the individual harmonic currents at each harmonic frequency $f_h$. The rms harmonic currents passing through output filter inductor Lo, resonant filter branch 151 and resonant filter branch 153 are therefore obtained by solving the following equations:

$$I_{0(rms)} = \sqrt{\sum_{f_0}^{\infty} I_0(f_m, f_h)^2}$$ Eq. 22

$$I_{1(rms)} = \sqrt{\sum_{f_0}^{\infty} I_1(f_m, f_h)^2}$$

$$I_{2(rms)} = \sqrt{\sum_{f_0}^{\infty} I_2(f_m, f_h)^2}$$

Figure 11:
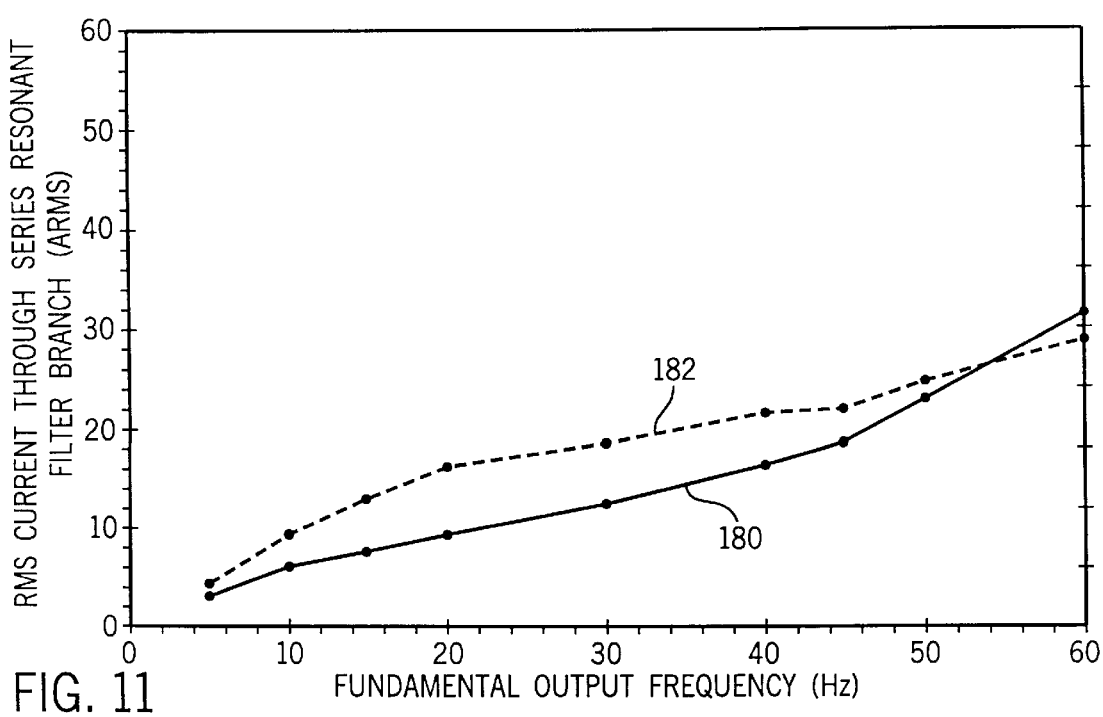
FIG. 11 is a graph illustrating RMS current data in the filter branches of the apparatus of FIG. 3 while operated at 350 Arms load current.

Solving Equation 22 using various fundamental output frequencies the waveforms of FIG. 11 result which illustrate the rms current through the $f_{r1}=f_c$ series resonant filter branch 151 and rms current through the $f_{r2}=2f_c$ series resonant filter branch 153 of FIG. 4 with $R_{f1}=0.1$ ohm as waveforms 180 and 182, respectively. The fact that $f_c$ harmonic voltages are lower than the $2f_c$ harmonic voltages in the 10 Hz to 45 Hz range in Table 1 results in branch 151 current being lower than branch 153 current. This is true until 60 Hz operation when the $f_c$ and $2f_c$ harmonics are both dominant and closer in magnitude resulting in approximately equal rms currents in the two resonant filter branches of FIG. 11.

The watts loss of the inventive filter is thus defined by the following equations:

$R_o$ Filter Watts Loss=$[I_{o(rms)}]^2 R_0$ $R_1$ Filter Watts Loss=$[I_{1(rms)}]^2 R_1$  Eq. 23

$R_2$ Filter Watts Loss=$[I_{2(rms)}]^2 R_2$

Knowing the rms currents of Eq. 22 and the watts loss Eq. 23, then the filter watts loss estimate can be determined.

Figure 12:
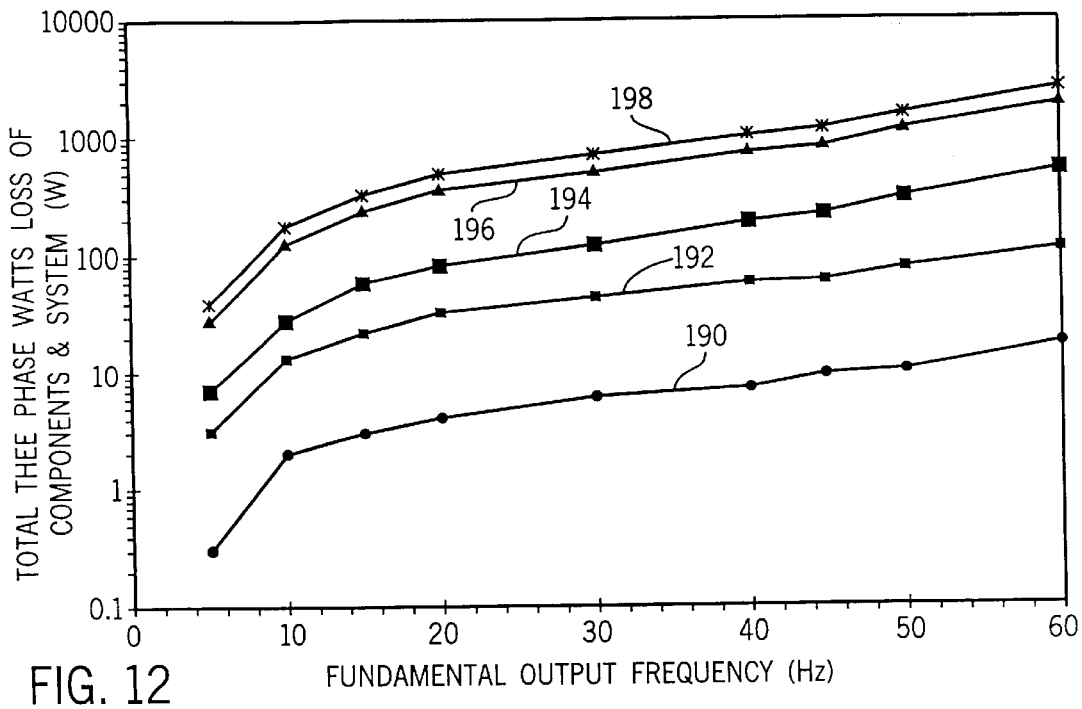
FIG. 12 is a graph illustrating calculated three phase watts loss vs. output frequency for the components which constitute the apparatus of FIG. 3.

FIG. 12 is a typical graph illustrating calculated three phase watts loss vs. output frequency of the apparatus of FIG. 3 operated at 350 Arms and with $R_{f1}=0.1$ ohm and $R_{f2}=0.1$ ohm. Waveform 190 is for series resonant filter capacitors $C_{f1}$ and $C_{f2}$ and due to the small resistance internal to the capacitor. Waveform 192 is for series resonant filter inductors $L_{f1}$, and $L_{f2}$ and due to the small winding resistance internal to the inductor. Waveform 194 is for output current limiting inductor $L_0$ and due to the small winding resistance and core loss internal to inductor construction. Waveform 196 is for series resonant filter resistors $R_{f1}$ and $R_{f2}$. Waveform 198 is total watts loss sum of all FIG. 10 inventive filter components at each fundamental output frequency.

D. Other Preferred Embodiments

Figure 9:
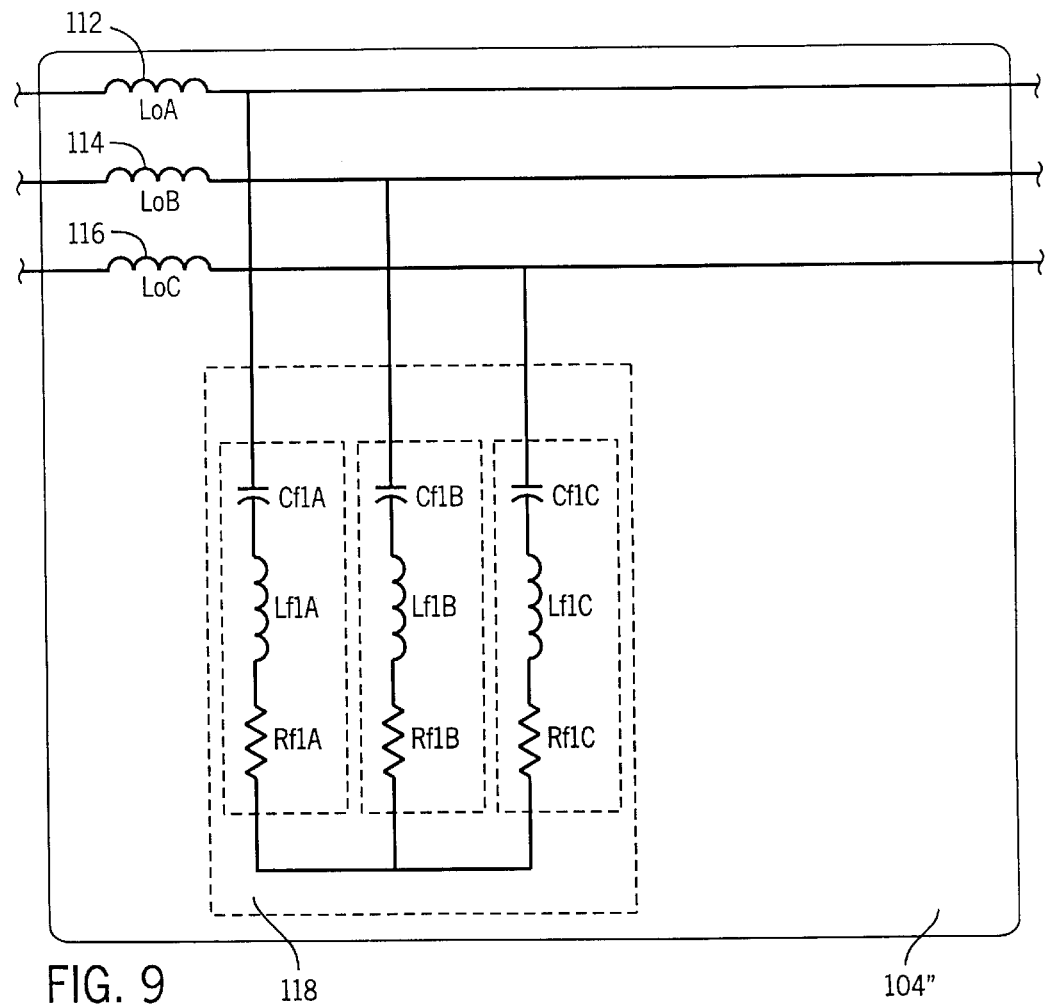
FIG. 9 is a third preferred embodiment of the invention, albeit including only a single filter configuration.

Referring now to FIG. 9, a third preferred embodiment 104" of the inventive apparatus is illustrated. Apparatus 104" generates a quasi-sinewave output which is acceptable for some applications. Each phase of the inventive filter consists of an output inductor Lo and a single series resonant filter branch, consisting of an inductor, a resistor and a capacitor with resonant frequency $f_{r1}=f_c$ and which is in parallel with the load. Filter output/input attenuation curves vs. frequency are plotted in FIG. 10 for $f_c=4$ kHz, Lo=125 uh, $L_{f1}=20$ uh, $C_{f1}=80$ uf, and resonant frequency $f_{r1}=f_c=4$ kHz. The $R_{f1}$ values were 1 ohm (waveform 170), 0.5 ohm (waveform 172), and 0.1 ohm (waveform 174). Capacitor $C_{f1}$ is essentially a short for frequencies above $f_{r1}$.

Figure 10:
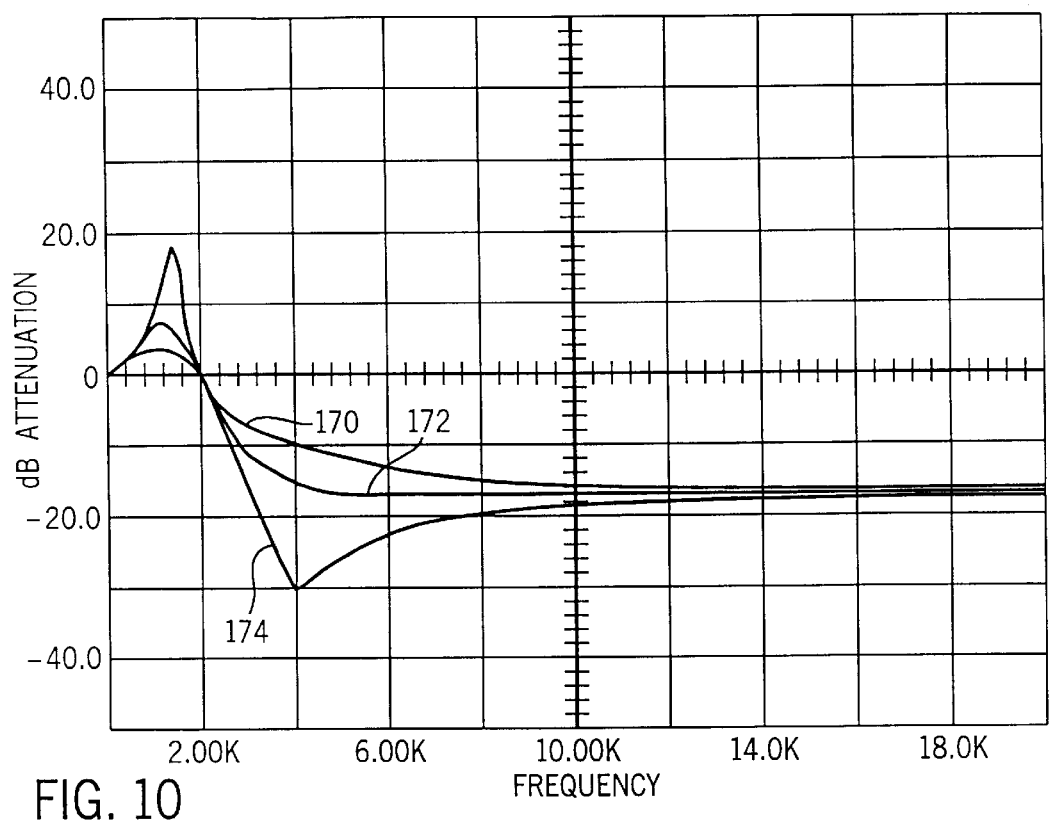
FIG. 10 is a graph illustrating filter attenuation in dB vs. frequency of the inventive filter apparatus of FIG. 9 with a resonant filter frequency equal to the VSI carrier signal frequency of 4 kHz with various resistor values.

The three waveforms 170, 172, 174 illustrate that for harmonic frequencies above resonant frequency $f_{r1}=f_c=4$ kHz, specifically PWM frequencies $2f_c$, $3f_c$ and $4f_c$, etc . . . , the filter attenuation in FIG. 10 is constant and independent of frequency and determined by impedance divider action between Lo and $L_{f1A}$. It is possible to choose $R_{f1}$ to function as a current limiting resistor at the $f_{r1}$ resonant frequency. However, the traces of FIG. 10 suggest that as $R_{f1}$ magnitude is increased, output/input filter attenuation decreases at $f_{r1}=f_c$, resulting in increased THD values for the load. Thus, idealized design methodology uses inductor Lo as the main current limiting device to the harmonic voltages and $R_{f1}$ is then adjusted to obtain a desired THD magnitude.

Apparatus 104" provides a quasi-sinusoidal waveform and is useful as a voltage-limiting device to eliminate destructive reflected wave voltage problems on motor insulation when long transmission line cables are used. This configuration is also sufficient to eliminate common mode electrical noise problems due to transmission line capacitive cable charging current, which would occur if the PWM pulses were applied to the cable and load without a filter.

E. Analytical Results of the Inventive Filter

For the purpose of discussion a carrier frequency $f_c=4$ kHz is assumed such that PWM harmonics diminish after $4f_c$ (i.e., after 16 kHz). Filter attenuation plots from 0 Hz to 20 kHz were done for a conventional low pass filter and the inventive filters. Five alternate embodiments (i.e., cases) of the inventive filter apparatuses shown in FIGS. 3 and 9 were considered for discussion purposes of a 350 Arms rated filter design.

Embodiment 0: For comparison purposes, a conventional sinewave low pass filter with output inductor=125 uh and output filter capacitor=800 uf in series with a resistor of 0.1 ohm is assumed. Resonant frequency of the conventional filter was thus 500 Hz. The output inductor value is the same value used in the inventive filter cases to provide an equal comparison of circuit performance. The output capacitor was adjusted to give equal filter attenuation performance to inventive filter of Case 4.

Embodiment 1: FIG. 9 configuration with a single resonant filter branch in parallel with the load. Lo=125 uh, $R_{f1}=0.1$ ohm, $L_{f1}=20$ uh and $C_{f1}=80$ uf. Series resonant filter branch resonant frequency $f_{r1}=4$ kHz or a condition where $f_{r1}=f_c$ Embodiment 2: FIG. 9 configuration with a single resonant filter branch in parallel with the load Lo=125 uh, $R_{f1}=0.1$ ohm, $L_{f1}=20$ uh and $C_{f1}=20$ uf. Series resonant filter branch resonant frequency $f_{r1}=8$ kHz or a condition where $f_{r1}=2f_c$ Embodiment 3: FIG. 9 configuration with a single resonant filter branch in parallel with the load, Lo=125 uh, $R_{f1}=0.1$ ohm, $L_{f1}=17.6$ uh and $C_{f1}=40$ uf. Series resonant filter branch resonant frequency $f_{r1}=6$ kHz or a condition where $f_c<$frl$<2f_c$ Embodiment 4: FIG. 3 configuration with a two resonant filter branches in parallel with the load, Lo=125 uh, $R_{f1}=0.1$ ohm, $L_{f1}=20$ uh and $C_{f1}=40$ uf. Series resonant filter branch #1 resonant frequency $f_{r1}=4$ kHz or a condition where $f_{r1}=f_c$; $R_{f2}=0.1$ ohm, $L_{f2}=20$ uh and $Cf_2=20$ uf. Series resonant filter branch #2 resonant frequency $f_{r2}=8$ kHz or a condition where $f_{r2}=2f_c$ Embodiment 5: FIG. 3 configuration with two resonant filter branches in parallel with the load but a low $R_fΩ$. Lo=125 uh, $R_{f1}=0.01$ ohm, $L_{f1}=20$ uh and $C_{f1}=40$ uf. Series resonant filter branch #1 resonant frequency $f_{r1}=4$ kHz or a condition where $f_{r1}=f_c$. $R_{f2}=0.01$ ohm, $L_{f2}=20$ uh and $C_{f2}=20$ uf. Series resonant filter branch #2 resonant frequency $f_{r2}=8$ kHz or a condition where $f_{r2}=2f_c$ Filter output/input attenuation for each of the dual resonant filter branch embodiments 4 and 5 is obtained using Equation 17. In addition, filter output/input attenuation for each of the single resonant filter branch embodiments 1, 2 and 3 is obtained using Equation 17 with the substitution of:

$$Zp=Z_1 \text{ where } \|Z_p\|=\|Z_1\| \text{ and } \theta_p=\theta_1$$

Figure 13:
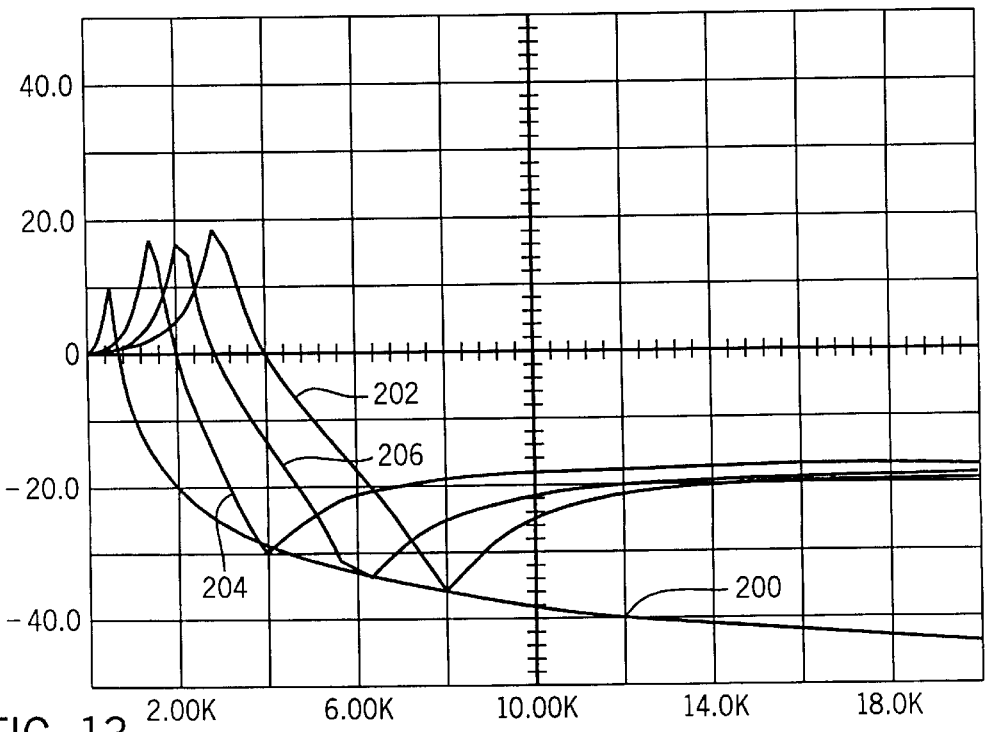
Figure 14:
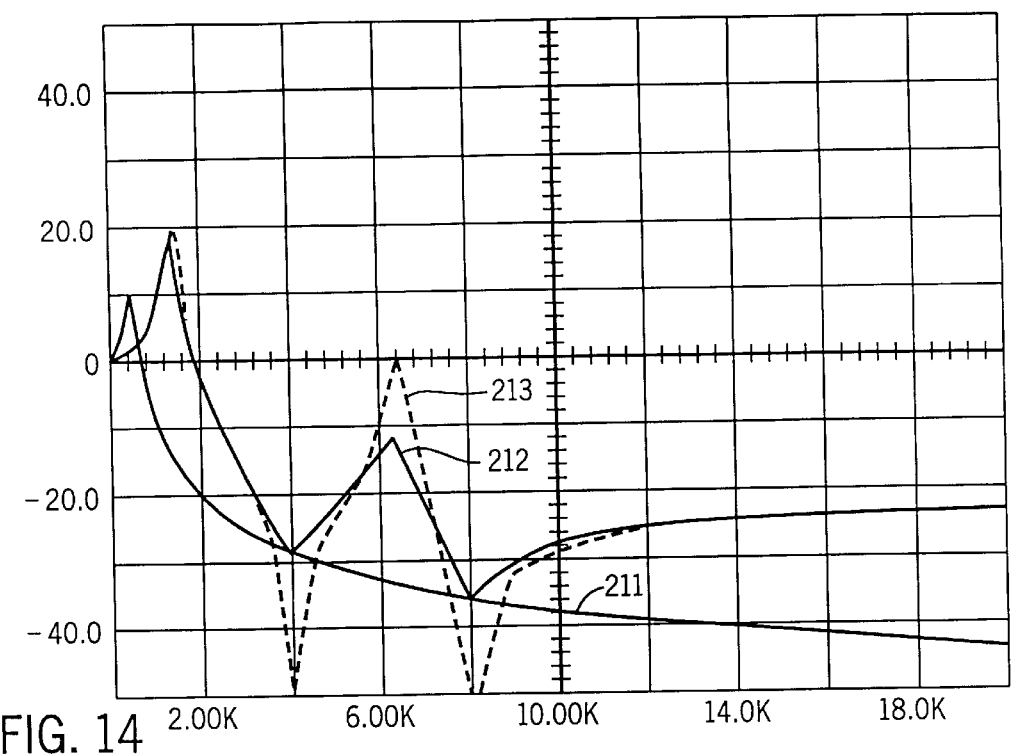
FIG. 14 is a graph illustrating filter attenuation in dB vs. frequency of the inventive filter apparatus of FIG. 3 with the omission of the resistor-capacitor low pass filter configuration but with dual series resonant filter configuration and which is compared to a waveform corresponding to the conventional inductor-capacitor low pass sinewave filter apparatus of FIG. 1(a)

Filter attenuation plots from 0 Hz to 20 kHz were done for all five embodiments with results for the conventional sinewave low pass filter and embodiments 1, 2 and 3 plotted in FIG. 13 as waveforms 200, 204, 202 and 206, respectively, and the results for the conventional sinewave low pass filter and embodiments 4 and 5 plotted in FIG. 14 as waveforms 211, 212 and 213, respectively.

Embodiment 1 Results: The results from embodiment 1 (i.e., waveform 204 in FIG. 13) show a −30 dB attenuation at resonant point $f_{r1}=f_c=4$ kHz. This is the same attenuation as the conventional low pass filter (i.e., waveform 200). Harmonic voltages at frequencies above the resonant frequency (i.e., $2f_c=8$ kHz and $3f_c=12$ kHz and $4f_c=16$ kHz) are attenuated by −18 dB independent of frequency. Harmonic frequencies applied that are above frequency $f_{r1}$ follow the high frequency equivalent circuit of FIG. 8. FIG. 13 shows output filter attenuation for frequencies above frequency $f_{r1}$ is constant and defined by impedance divider action between series resonant inductance $L_{f1}$ and current limiting inductance Lo. Predicted attenuation for the $f_h>f_{r1}$ is thus −20 LOG[20 uh/(20 uh+125 uh)] or −17.2 dB.

The conventional sinewave filter (i.e., waveform 200) has ~−40 dB attenuation in the $f_h>f_{r1}$ region. Thus, it is unlikely a sinewave quality waveform results from embodiment 1. However, embodiment 1 is a candidate for a low cost single branch filter design to obtain a quasi-sinewave waveform that is just sufficient to reduce reflected wave voltage problems on long cables, reduce peak reflected wave voltages on motor stator insulation to acceptable levels for standard motors and reduce the common mode (e.g. Line-to-ground) electrical noise current that occurs when the steep fronted PWM pluses on long drive to motor cables.

Embodiment 2 Results: Embodiment 2 results are illustrated as waveform 202 in FIG. 13 and show a −36 dB attenuation at the resonant point $f_{r1}=2f_c=8$ kHz. This is the same attenuation as a conventional low pass filter (i.e., waveform 200). Harmonic voltages at frequencies above the resonant frequency (e.g. $3f_c$-12 kHz and $4f_c$-16 kHz) are seen to be attenuated by −20 dB, independent of frequency and follow the impedance divider rule for frequencies above the $f_{r1}$ point. Predicted attenuation for the $f_h>f_{r1}$ is thus −20

LOG[20 uh/(20 uh+125 uh)] or −7.2 dB. The conventional sinewave filter has approximately −40 dB in the $f_h$>$f_{r1}$ region. However, the disadvantage of this filter selection is that there is no attenuation (~0 dB) at the $f_c$ harmonic voltage. Thus, this filter design methodology is undesirable.

Embodiment 3 Results: Embodiment 3 results are illustrated as waveform 206 in FIG. 13. To configure embodiment 3, a system designer chooses a filter series resonant point $f_{r1}$=6 kHz between the two dominant PWM harmonics at $f_c$=4 kHz and $2f_c$=8 kHz. Thus, the $f_{c=4}$ kHz harmonic is attenuated by −14 dB, the $2f_c$=8 kHz harmonic is attenuated by −25 dB and at the harmonic frequencies above the 6 kHz resonant frequency (e.g. $3f_c$=12 kHz and $4f_c$=16 kHz) attenuation is a constant −20 dB. This filter design methodology to construct embodiment 3 can be used to construct a low cost single branch filter design to obtain a quasi-sinewave over a wide speed range from 10 Hz to 60 Hz.

Embodiment 4 Results: Embodiment 4 results are illustrated as waveform 212 in FIG. 14. Using the topology of FIG. 3, a system designer selects two series resonant filters, one centered at $f_{r1}$=$f_c$=4 kHz and another at $f_{r2}$=$2f_c$=8 kHz. In this manner the two dominant PWM voltage harmonics (i.e., $f_c$ and $2f_c$) have maximum attenuation.

Waveform 212 corresponding to embodiment 4 is a composite of the waveform of embodiment 1 (i.e., single $f_c$=4 kHz series resonant filter) and embodiment 2 (i.e., single $2f_c$=8 kHz series resonant filter) from FIG. 13. Composite filter attenuation waveform 212 follows the single $f_{r1}$=$f_c$=4 Khz filter waveform (i.e., waveform 204) until 6 kHz when composite attenuation follows the single $f_{r2}$=$2f_c$=8 kHz filter (i.e., waveform 202). Composite attenuation above $2f_c$ is determined by the parallel combination of $L_{f1}$ and $L_{f2}$ inductors along with Lo. The minimum impedance of the two series resonant filters at each respective resonant frequency $f_c$ and $2_{fc}$ circulate the resulting $f_c$ and $2_{fc}$ current harmonics in the shunt resonant filter branches and not the load such that the current harmonics do not cause load voltage harmonics.

Filter attenuation at the applied PWM harmonics $f_c$ and $2_{fc}$ using embodiment 4 is identical to the conventional low pass filter which is represented by waveform 211 in FIG. 14. PWM harmonics above the second filter resonant $2f_c$ frequency are attenuated by the inventive filter at a constant −24 dB. Harmonic frequencies which are above the $f_{r2}$ frequency follow the high frequency equivalent circuit of FIG. 8. FIG. 14 shows output filter attenuation for frequencies above the $f_{r2}$ frequency is constant and defined by impedance divider action between the parallel combination of series resonant inductance $L_{f1}$ and $L_{f2}$, with current limiting inductance Lo. Predicted attenuation for frequencies fh>fr *from equivalent circuit analysis is* −20 LOG[10 uh/(10 uh+125 uh)] or −23 dB and matches FIG. 14 detailed analysis.

The conventional sinewave filter has approximately −40 dB attenuation in the $f_h$>$f_{r2}$ region. While a 17 dB attenuation difference exists between the conventional filter and embodiment 2 in the $f_h$>$f_{r2}$ region, it is also known that the PWM harmonics are not dominant in this region. Thus, THD magnitude of the inventive filter is very close to that of the conventional low pass sinewave filter.

R-C configuration 122 (see FIG. 3) may be included if a lower THD value in the $f_h$>$f_{r2}$ region is desired. This inventive filter design is a candidate to obtain a sinewave quality waveform over a wide speed range form 10 Hz to 60 Hz.

An advantage of embodiment 4 over the conventional filter design is that embodiment 4 can be used for fundamental frequencies up to the industrial 400 Hz power system standards. For equivalent filter attenuation performance in FIG. 13, it is seen that the inventive filter has 0 dB gain and is stable at 400 Hz while the conventional filter has a +8 dB gain at 400 Hz and is unstable.

A significant advantage of embodiment 4 over the conventional filter design is that for equivalent filter attenuation performance with a PWM VSI, the filter current which must be supplied by the VSI at the fundamental frequency (e.g. 60 Hz) is substantially smaller in magnitude. Line-to-neutral output impedance of the conventional filter is 3.3 ohms at 60 Hz using Xc=1/[2π(60 Hz)(C)] with C=800 uf. Thus, for a 480 V 300 kVA design system with a line-to-neutral voltage of 277 Vrms, fundamental 60 Hz current supplied to the inventive filter is only 6 Arms, while the conventional filter draws 83 Arms or 13 times more reactive current for an identical harmonic filter has a distinct advantage in terms of size and cost for a harmonic attenuation performance that is approximately identical. This example focuses the distinct advantages of the inventive filter operated on a VSI. The inventive filter also overcomes the disadvantages associated with a conventional filter which are listed below.

First, to obtain low THD performance, the conventional filter design requires a large output capacitor and large reactive current that must be supplied by the VSI at startup. The majority of VSI overload kVA circulates current in the filter while starving the current required by the load. This has been observed to result in unstable system operating conditions and load oscillations at startup, with resultant shutdown of the system. The inventive filter overcomes this problem by limiting the filter current.

Second, to obtain low THD performance, the conventional filter design requires large reactive current which must be supplied by the VSI in addition to the load. This places the VSI into overload operation for an inverter rating sized comparable to load requirements. The VSI overload self-protect feature then functions to disconnect the VSI from the load. By limiting the filter current the large reactive current is substantially reduced thereby reducing the number of inadvertent disconnects.

Third, to obtain low THD performance, the conventional filter design requires large reactive filter kVA which must be supplied by the VSI in addition to the load. The only solution often is to use a significantly larger inverter rating for the same size load powered without a filter. Again, limiting the filter current overcomes this problem.

Embodiment 5 Results: Embodiment 5 results are represented by waveform 213 of FIG. 14. Using the configuration of FIG. 3 a system designer selects two series resonant filters, one centered at $f_{r1}$=$f_c$=4 kHz and another at $f_{r2}$=$2f_c$=8 kHz and selects $R_{f1}$ and $R_{f2}$ resistors=0. As illustrated, embodiment 5 reduces output THD values and filter power loss. With $R_{f1}$=$R_{f2}$=0, the impedance of the two series resonant filters at each respective $f_c$ and $2f_c$ resonant frequency is further minimized as compared to embodiment 4. Thus, the resulting $f_c$ and $2f_c$ current harmonics are more completely contained in the shunt resonant filter branches and are not provided to the load where the current harmonics can develop load voltage harmonics. This implies the two dominant PWM voltage harmonics at $f_c$ and $2f_c$ have maximum attenuation and therefore reduced THD magnitudes.

PWM harmonics above the second filter resonant $2f_c$ frequency are attenuated by the inventive filter at a constant −24 dB in FIG. 14, exactly as in embodiment 4 for the reasons discussed above. Greater filter attenuation at $f_c$ and $2f_c$ in FIG. 14 is offset by less attenuation at the midpoint frequency between $f_c$ and $2f_c$, e.g. 6 kHz. However, this is not a disadvantage since there is not a PWM VSI frequency to excite this mode so that rms filter current remains essentially as in embodiment 4. This inventive filter design methodology is a candidate to obtain a sinewave quality waveform over a wide speed range from 10 Hz to 60 Hz.

THD magnitudes for embodiments 0 through 5 are compared as follows. The discrete voltage harmonic characteristics of the Table 1 PWM VSI were applied as inputs to the filter output/input attenuation curves of embodiments 0 through 5 and resultant output harmonic voltages at each harmonic and sideband were calculated for the 10 Hz to 52 Hz modulation index operating conditions using Equation 6 for each filter embodiment.

Figure 15:
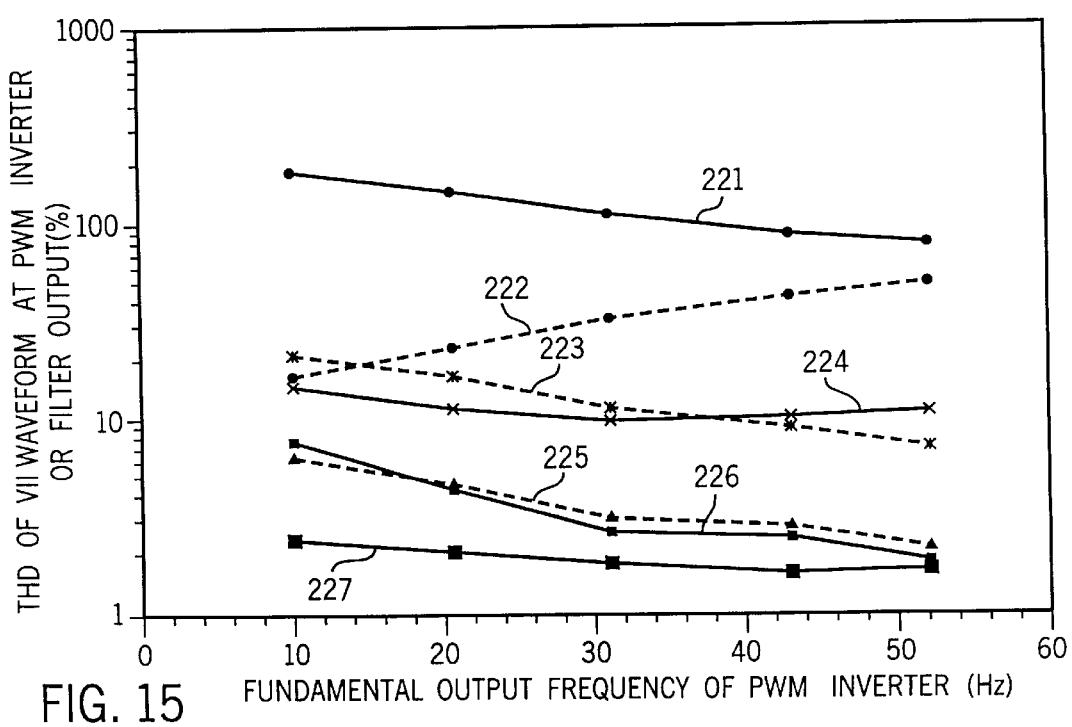
FIG. 15 is a graph illustrating THD of the inverter line-to-line output voltage vs. VSI output frequency for seven filter configurations.

Waveform 221 of FIG. 15 illustrated the THD in an unfiltered case with PWM harmonic voltages of the voltage source inverter applied directly to the load. THD=180% @ 10 Hz and is reduced to 72% @ 52 Hz.

Waveform 227 of FIG. 15 illustrates the THD generated by embodiment 0 described above which consists of a conventional sinewave low pass filter positioned between the inverter and load. THD=2.50% @ 10 Hz and is reduced to 1.5% @ 52 Hz.

Waveform 222 of FIG. 15 illustrates the THD generated by embodiment 2 described above which consists of an output inductor and a single series resonant filter branch in parallel with the load and having a resonant frequency of $f_{r1}=2f_c$. THD=16% @ 10 Hz and increases to 45% @ 52 Hz. The design methodology for this configuration is not practical or useful.

Waveform 223 of FIG. 15 illustrates the THD generated by embodiment 1 described above which consists of an output inductor and a single series resonant filter branch in parallel with the load with a resonant frequency $f_{r1}=f_c$ THD=21% @ 10 Hz and is reduced to 6.5% @ 52 Hz. This configuration provides a quasi-sinusoidal waveform and is useful as a voltage-limiting device to eliminate destructive reflected wave voltage problems on motor insulation when long transmission line cables are used.

This configuration is also sufficient to eliminate common mode electrical noise problems due to transmission line capacitive cable charging current which would occur if the PWM pulses were applied to the cable and load without a filter.

Waveform 224 of FIG. 15 illustrates the THD generated by embodiment 3 described above which consists of an output inductor and a single series resonant filter branch in parallel with the load with a resonant frequency $f_c<f_{r1}<2f_c$. The advantage of embodiment 3 over embodiment 1 is a more uniform THD performance across the entire fundamental frequency operating range. THD=14% @ 10 Hz and is reduced to 9.8% @ 52 Hz. Thus, embodiment 3 provides a quasi-sinusoidal waveform and is useful as a voltage-limiting device to eliminate destructive reflected wave voltage problems on motor insulation when long transmission line cables are used. This configuration is also sufficient to eliminate common mode electrical noise problems due to transmission line capacitive cable charging current, which could occur if the PWM pulses were applied to the cable and load without a filter.

Waveform 225 of FIG. 15 illustrates the THD generated by embodiment 4 described above which consists of an output inductor and dual series resonant filter branch in parallel with the load with series resonant branch frequencies $f_{r1}=f_c$ and $f_{r2}=2f_c$. THD=6.4% @ 10 Hz and is reduced to 2.09% @ 52 Hz. The 52 Hz value is comparable to the THD=1.5% of the conventional low pass filter design. This configuration provides a sinusoidal waveform which is more than adequate for motor type loads and useful for critical passive loads where low THD magnitudes are required. This inventive filter configuration has been prototyped and has proved to supply variable-voltage variable-frequency sinewave power to a 300 kVA motor load with 10,000 ft of cable between the VSI and motor.

Waveform 226 of FIG. 15 illustrates the THD generated by embodiment 5 described above which consists of an output inductor and dual series resonant filter branch in parallel with the load with series resonant branch frequencies $f_{r1}=f_c$ and $f_{r2}=2f_c$, but with removal of series branch resistors $R_{f1}$ and $R_{f2}$. This reduces THD @ 52 Hz from 2.09% to 1.7% and is nearly identical to the THD of the conventional low pass filter design. More importantly, removal of $R_{f1}$ and $R_{f2}$ results in a practical low-loss filter circuit. This configuration provides a low loss filter circuit which provides a sinusoidal waveform over a wide fundamental frequency range which is more than adequate for motor type loads and which is also useful for critical passive loads where low THD magnitudes are required.

Figure 16A:
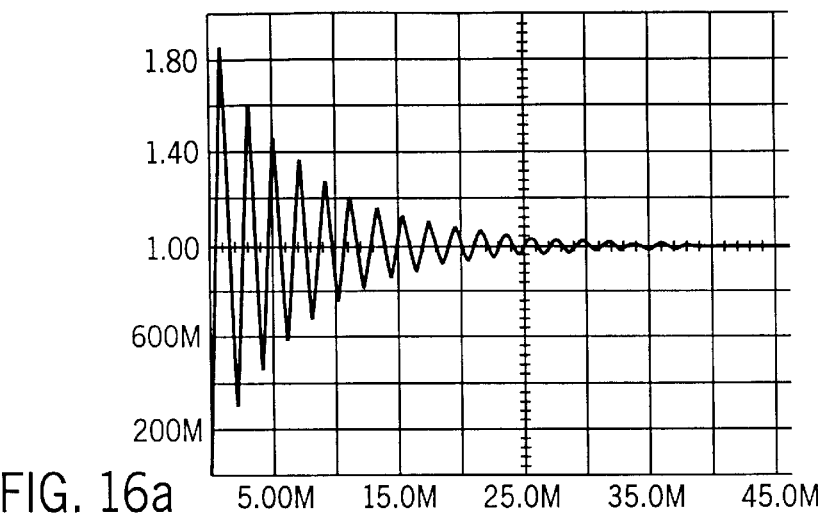
FIGS. 16a through 16c are filter output transient responses to unit step impulse voltages applied to a conventional filter and two inventive filter apparatuses, respectively.
Figure 16B:
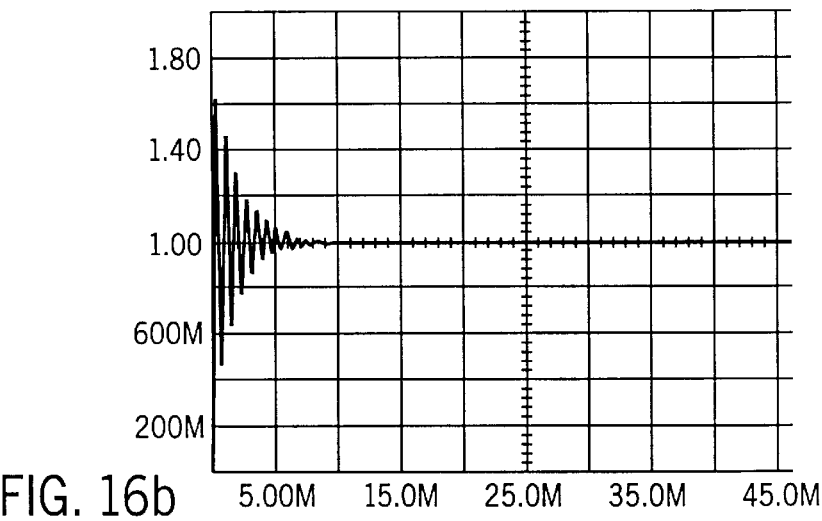

The transient step response of the apparatus of FIG. 3 is also significantly superior to the conventional low pass filter of FIG. 1*a* when comparing designs that provide equal harmonic attenuation performance. The filter response to a unit step input function employing embodiment 0 is illustrated in FIG. 16*a*. Following a 1.88 pu overshoot, the transient response fully decays to unity in 40 ms. The filter response to a unit step input function employing embodiment 4 is illustrated in FIG. 16*b*. Following a 1.76 pu overshoot, transient response fully decays to unity in 8 ms or five times faster than with embodiment 0. Faster response is a result of using lower value output capacitors in the inventive filter design.

Figure 20:
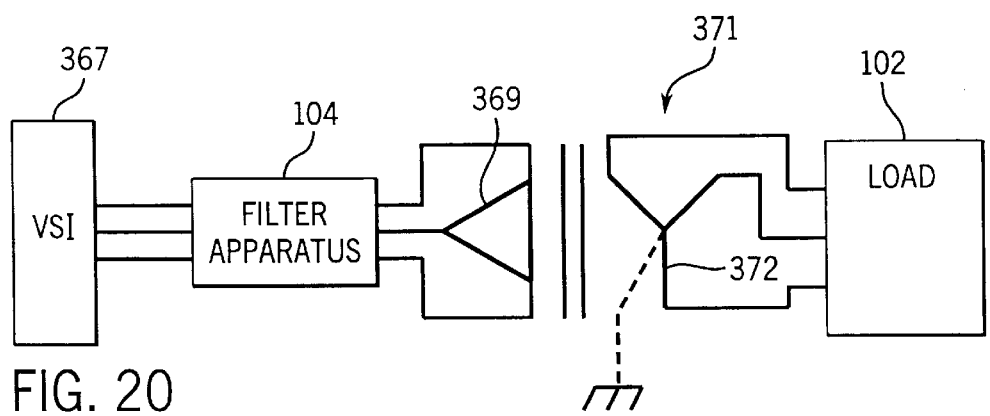
FIG. 20 is another embodiment of the invention wherein the filter apparatus of FIG. 3 is linked between a VSI and the primary windings of a transformer.

FIG. 20 is a schematic diagram of an alternate system configuration using the basic inventive filter apparatus 104 of FIG. 3 which positions the apparatus between a VSI 367 and a primary winding 369 of a step-up or step-down transformer 370. The transformer secondary windings 372 are linked to a load (e.g., a motor or passive resistor-inductor load) via long transmission line cables. The inventive filter apparatus of FIGS. 8 and 9 may also be substituted for apparatus 104 in FIG. 20. With this configuration, the filter absorbs most of the inverter harmonic voltages so that increased transformer harmonic watts loss due to high frequency copper and core loss effects is negligible. Thus, sinewave rated transformers may be used.

F. Experimental Results

Figure 17:
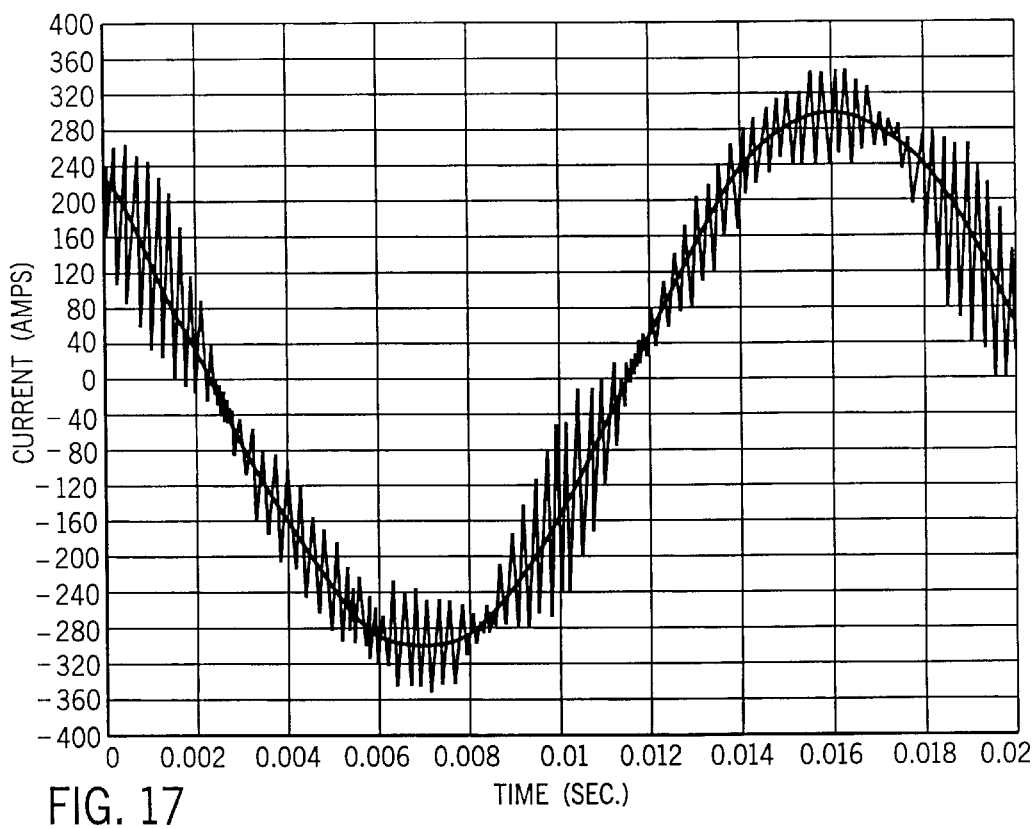
FIG. 17 is a graph including a measured waveform illustrating the phase current on the input side of the apparatus of FIG. 3 including dual resonant filters.

FIG. 17 includes a waveform illustrating a phase current on the input side of the apparatus of FIG. 3 using dual series resonant filters with configuration 118 having a resonant frequency $f_{r1}=f_c=4$ kHz and configuration 120 having a resonant frequency of $f_{r2}=2f_c=8$ kHz. The fundamental operating frequency $f_1=55$ Hz. A sinewave quality 300 Apk fundamental frequency load current is seen as well as a low peak-to-peak harmonic filter current magnitude which is supplied by the inverter and is superimposed onto the Lo choke current of FIG. 3. The X axis time scale is in seconds and Y axis scale is current in amperes.

Figure 18:
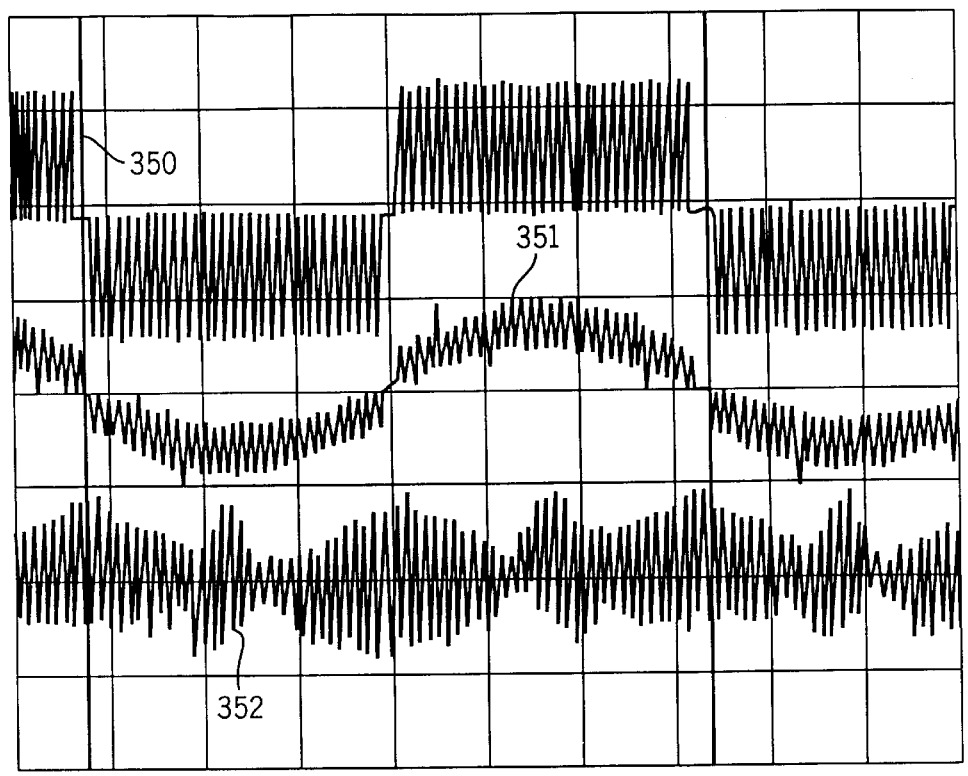
FIG. 18 is a graph including various waveforms including inverter line-to-line voltage as measured on the input side of the apparatus in FIG. 9, line-to-line voltage on the output side of the apparatus in FIG. 9 and harmonic current in the 4 kHz resonant apparatus of FIG. 9.

Referring to FIG. 18, FIG. 18 includes several waveforms 350, 351 and 352. Waveform 350 corresponds to inverter line-to-line voltage on the input side of apparatus 104" in FIG. 9 which uses only a single series resonant filter with $f_{r1}=f_c=4$ kHz. The PWM VSI fundamental output frequency is 30 Hz. The filter output is linked to a step-up transformer configuration (see 371 in FIG. 20). Waveform 351 illustrates line-to-line voltage on the output side of apparatus 104". Waveform 352 illustrates the harmonic current in the 4 kHz resonant apparatus 104".

Figure 19:
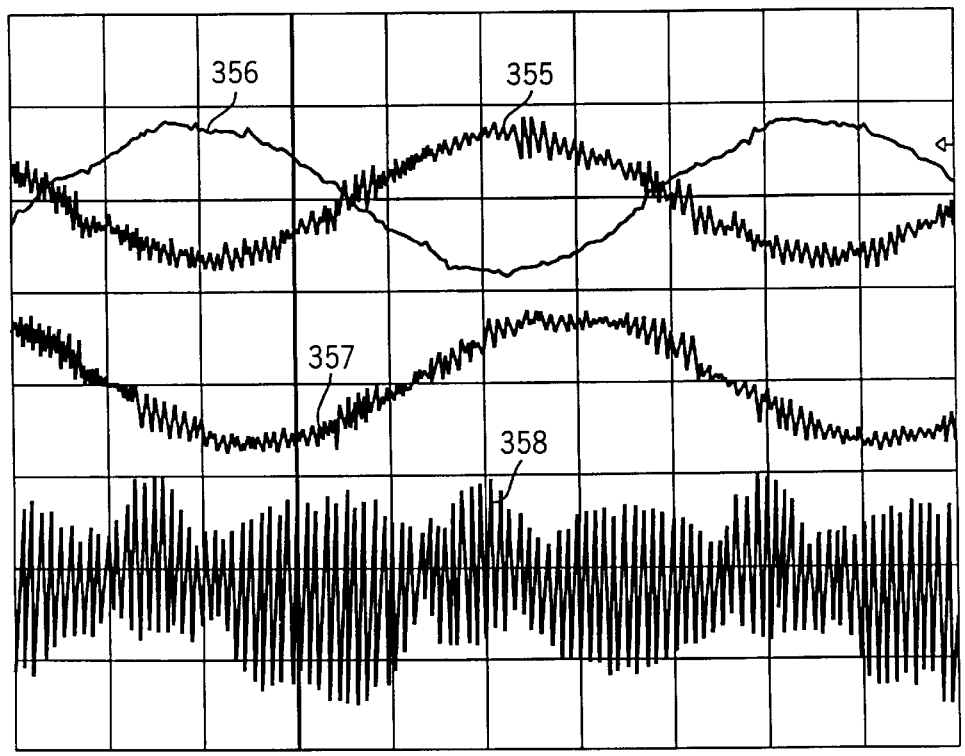
FIG. 19 is a graph including various waveforms illustrating line-to-line voltage as measured on the output side of the apparatus of FIG. 3 with $f_{r1}=f_c-4$ kHz and $f_{r2}=2f_c=8$ kHz, a measured waveform illustrating the harmonic current in both 4 kHz and 8 kHz configurations of the inventive apparatus of FIG. 3, a measured waveform illustrating the line-to-line voltage on a transformer secondary side and a load phase current on the transformer secondary side at 100 A/div.

FIG. 19 also includes several waveforms 355, 356, 357 and 358. Waveform 355 is a measured waveform illustrating the line-to-line voltage on a transformer secondary side. Waveform 356 illustrates the load phase current on the transformer secondary side at 100 A/div. Waveform 357 illustrates line-to-line voltage on the output side of apparatus 104 (see FIG. 3) which includes dual series resonant filters with $f_{r1}=f_c=4$ kHz and $f_{r2}=2f_c=8$ kHz. PWM VSI fundamental output frequency is 30 Hz. Inventive filter output is linked to a step-up transformer configuration. Waveform 358 illustrates the harmonic current in both 4 kHz and 8 kHz resonant configurations 118, 120, respectively, of FIG. 3.

Referring to FIGS. 18 and 19, comparison of waveforms 351 and 357 show that sinewave voltage quality and reduced THD is possible with the dual resonant filter approach over that of the single series resonant approach. Waveform FIG. Waveform 351 is acceptable as a solution for reduced dv/dt and reduced reflected wave motor voltage problems at the motor terminals.

Figure 21A:
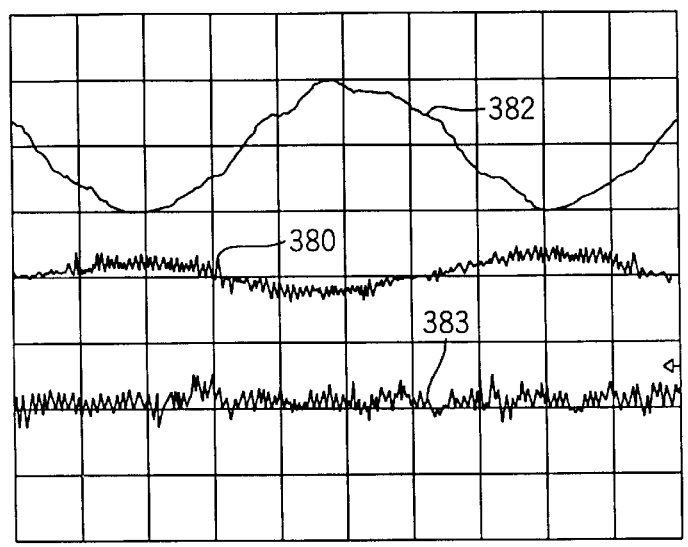
FIGS. 21a–21e include graphs corresponding to the embodiment of FIG. 20 which were generated using 15 Hz, 30 Hz, 45 Hz, 60 Hz and 80 Hz fundamental frequencies, the waveforms illustrating THD, apparatus output current, line-to-line output voltage and various other operating characteristics.
Figure 21B:
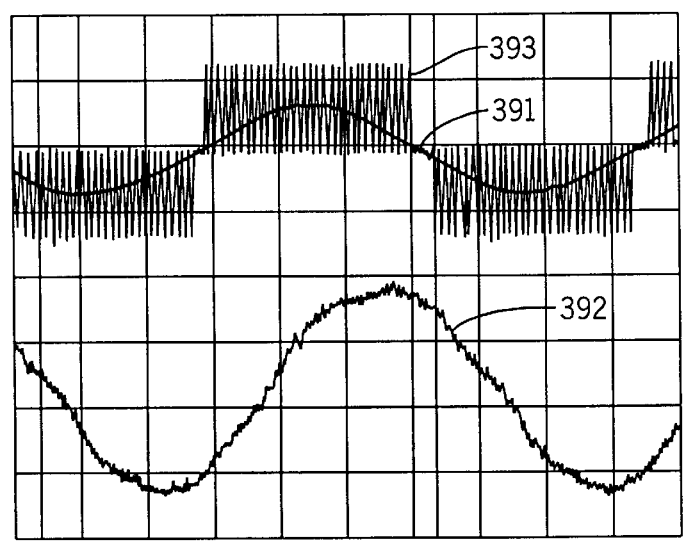
Figure 21C:
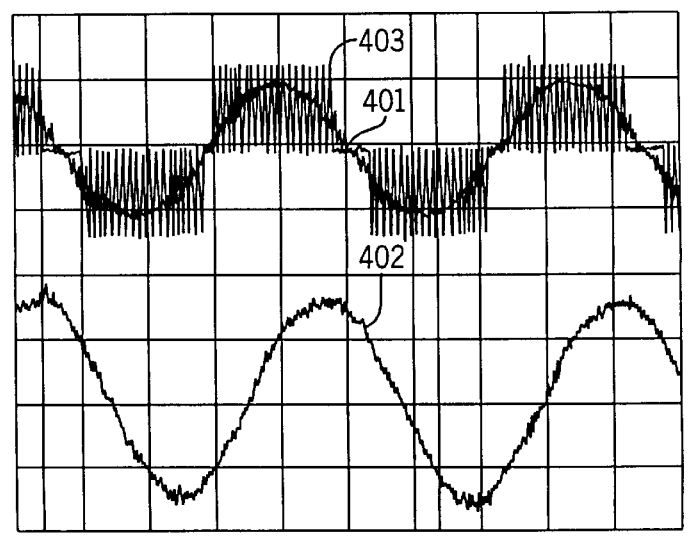

FIGS. 21a through 21c include experimental waveforms generated using the basic inventive apparatus of FIG. 20. In each case, the transformer included a 1:1 turns ratio and was used to test a 460 V 60 Hz motor load. The apparatus 104 of FIG. 20 consisted of dual series resonant filters with $f_{r1}=f_c=4$ kHz and $f_{r2}=2f_c=8$ kHz, $R_{f1}=R_{f2}=0.1$ ohm and an output choke Lo (i.e., configuration 122 was not included). FIGS. 21a through 21c are provided to show the filtered fundamental line-to-line output voltage as the PWM VSI is operated with a conventional rated volts/Hz (e.g. 460 V/60 Hz) control algorithm at frequencies from 15 Hz to 80 Hz.

A low-end 15 Hz VSI fundamental frequency setting tested the ability of the basic inventive filter to output a good quality line-to-line sinewave voltage waveform where the $2f_c=8$ kHz PWM harmonic voltages are dominant. FIG. 21a corresponds to 15 Hz operation. Waveform 380 is the line-to-line output voltage (500 V/div) of the inventive filter showing the 15 Hz sinewave fundamental frequency component has a low THD value. Waveform 382 is the inventive filter output phase current feeding the transformer primary. The current is distorted due to a high volts/Hz boost setting of the PWM controller that is required for motor starting and low frequency operation. The current tends to saturate the transformer steel core and cause current distortion.

FIG. 21b corresponds to 30 Hz operation. Waveform 391 is the line-to-line output voltage (500 V/div) of the inventive filter showing the 30 Hz sinewave fundamental frequency component has a low THD value. The sinewave peak is ~½ of the bus voltage as required for 30 Hz operation. Waveform 392 is the inventive filter output phase current feeding the transformer primary. Waveform 393 is line-to-line output voltage (500 V/div) at the inverter output showing the 650 Vdc peak voltages of the PWM pulse train.

The mid-range 45 Hz VSI fundamental frequency setting tested the inventive filter where the $2f_c=4$ kHz PWM harmonic voltages start to become significant. FIG. 25c corresponds to 30 Hz operation. In FIG. 21c, waveform 401 is the line-to-line output voltage (500 V/div) of the inventive filter showing the 45 Hz sinewave fundamental frequency component has a low THD value. The sinewave peak is ~¾ of the bus voltage as required for 45 Hz operation. Waveform 402 is the inventive filter output phase current feeding the transformer primary. Waveform 403 is the line-to-line output voltage (500 V/div) at the inverter output showing 650 Vdc peak voltages of the PWM pulse train.

Figure 21D:
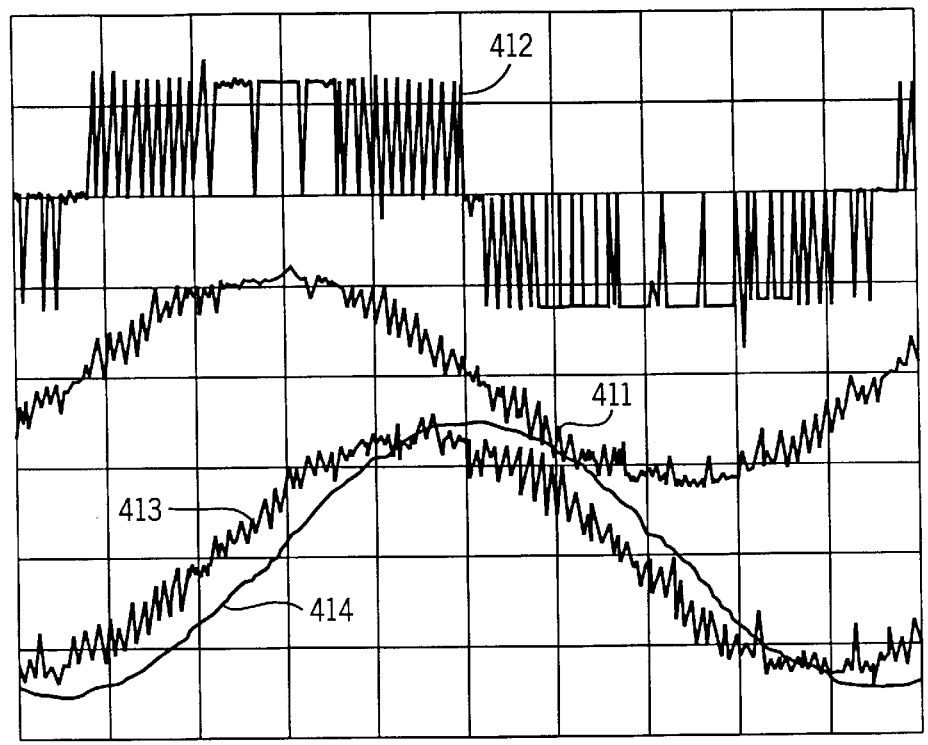

The 60 Hz VSI fundamental frequency setting tested the inventive filter where both 4 kHz and 8 kHz PWM harmonic voltages are dominant. FIG. 21d corresponds to 60 Hz operation. In FIG. 25d waveform 411 is the line-to-line output voltage (500 V/div) of the inventive filter showing the 460 V 60 Hz sinewave fundamental frequency component has low THD while entering the over-modulation region. The sinewave peak is at the bus voltage as required for 60 Hz operation. Waveform 412 is line-to-line output voltage (500 Vdiv) at the inverter output that corresponds with waveform 411 and shows that the 650 Vdc peak voltages of the PWM pulse train. Waveform 412 also shows the pulse dropping occurring at the peaks of waveform 411 which is characteristic of the over-modulation region. Waveform 413 is one of the line-to-neutral voltages (250 V/div) at the transformer secondary showing correct magnitude of ($460\sqrt{2}/\sqrt{3}$) and a phase shift from waveform 411 line-to-line voltage. Waveform 414 is the line-to-neutral phase current with low ripple current in the transformer secondary that corresponds to voltage waveform 413.

Figure 21E:
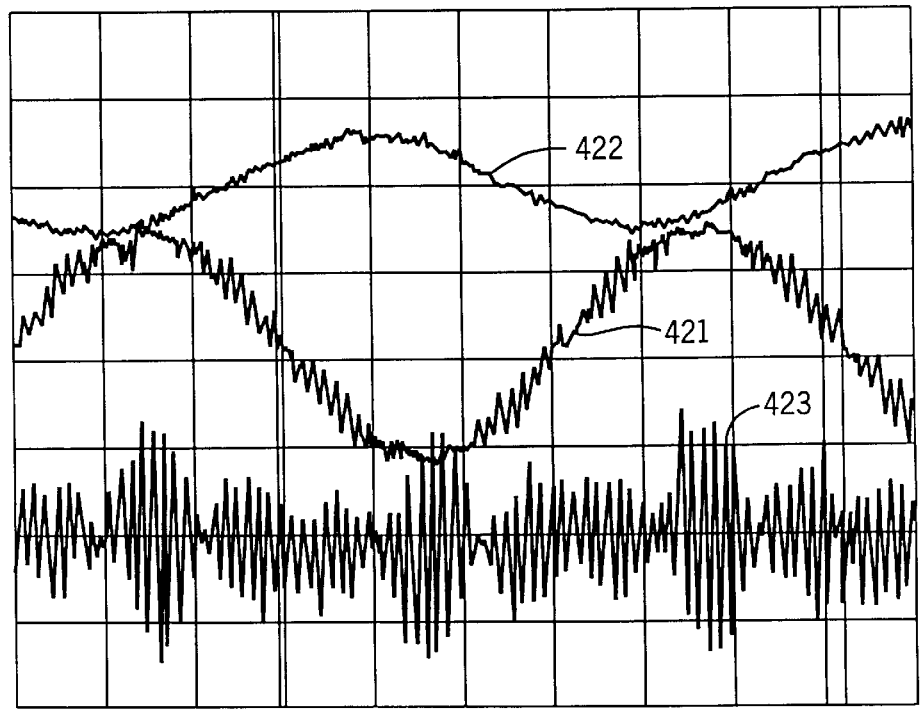

The 80 Hz VSI fundamental frequency setting tested the inventive filter in the over-modulation region where both $f_c=4$ kHz and $2f_c=8$ kHz PWM harmonic voltages are dominant. FIG. 21e corresponds to 80 Hz operation. In FIG. 21e waveform 421 is the line-to-line output voltage (500 V/div) of the inventive filter showing the 80 Hz sinewave fundamental frequency component has low THD while in the over-modulation region. Waveform 422 is a line-to-neutral phase current (100A/div) with low ripple current in the transformer secondary. Waveform 423 is a harmonic current flow in the phase leg of the 4 kHz filter.

Thus, independent of operating frequency, the inventive apparatus (e.g., 104 in FIG. 3) delivers essentially sinusoidal voltages to a load.

G. Selecting Configuration Devices

This section of the specification illustrates how one skilled in the art would proceed to configure an apparatus according to the present invention. Component selection and methodology varies with the three variations of the inventive filter apparatus shown in FIGS. 3, 7 and 9. Determining exact component values to meet a desired THD specification is a complex process but some guidelines on selection of initial component values are presented based on the analytical and experimental results described above.

Referring to FIG. 9 apparatus 104" consisting of a single resonant filter branch is selected as the lowest cost option when THD values of approximately 10% to 20% are acceptable, similar to the THD obtained with waveform 223 and waveform 224 shown in FIG. 15. A primary selection criteria for a maximum output inductor Lo value is to have less than a 3% to 5% voltage drop at rated load current and rated fundamental frequency. Inductor Lo also functions as the main current limiting component to the applied harmonic voltage amplitudes supplied by the inverter, while configuration 118 devices $L_{f1}$, $C_{f1}$ and $R_{f1}$, must be sized to limit the resulting harmonic current magnitude through filter apparatus 118. Initial selection of Lo according to the primary criteria limits rms harmonic current magnitudes to an acceptable 10% to 20% of rated inverter fundamental output current when harmonic voltages of Table 1 are applied to apparatus 118. The value of Lo may be increased to reduce the harmonic current magnitude but at the expense of fundamental voltage drop.

Selection of the optimum resonant frequency $f_{r1}$ for the series $L_{f1}$, $C_{f1}$ and $R_{f1}$ circuit depends on the fundamental operating frequency range desired. Selecting $f_{r1}=f_c$ gives minimum THD results for operating frequencies >45 Hz as waveform 223 in FIG. 15 illustrates. Selecting $f_c<f_{r1}<2f_c$ or 1.5 $f_c$ gives minimum THD results over a wide operating frequency range as waveform 224 in FIG. 15 shows. $L_{f1}$ and $C_{f1}$ values can be used to select resonant frequency $f_{r1}$ as indicated by Equation 12.

Referring to FIG. 9, the maximum value for Lf, is approximately 15%–20% of Lo, so that the higher order harmonics (i.e., harmonics $>f_c$) are attenuated by −20 dB as in FIG. 13 and the filter THD goal of 10% to 20% is met. Once $L_{f1}$, is defined $C_{f1}$ may then be determined by using the resonant frequency Equation 12. The value of $C_{f1}$ determines the fundamental frequency current flowing in configuration 118. The $L_{f1}$ and $C_{f1}$ values may be adjusted so that <2% of rated inverter output current flows through configuration 118 at the fundamental frequency.

The value for $R_{f1}$ is preferably constrained by minimizing the resonant circuit branch impedance at the predominant $f_c$ harmonic. The filter output THD value increases as $R_{f1}$ is increased. Maximum $R_{f1}$ value magnitude is limited by the necessity to obtain a minimum −30 dB to −40 dB filter output/input attenuation at $f_c$. Thus, the value of $R_{f1}$ is selected to dampen resonance and not necessarily to limit current. Maximum $R_{f1}$ value is also limited by the necessity of providing a low impedance at higher order harmonics. It is desirable to maintain $R_{f1}$ less than the high frequency impedance of $L_{f1}$ so that the high order harmonics are properly attenuated by $L_{f1}$ in FIG. 8. Thus $R_{f1}<(2\pi f_h L_{f1})$ for $f_h$ between $f_c$ and $4f_c$. Practically, it is desirable to make $R_{f1}=0$ to minimize power loss. Circuit operation with $R_{f1}=0$ is possible as long as system resonance conditions are analyzed.

Referring to FIG. 3, apparatus 104 consisting of a dual resonant filter configuration is selected as the best option when THD values of ~2% at 60 Hz to 6% at 10 Hz are acceptable, similar to the THD obtained with waveform 225 and waveform 226 shown in FIG. 15. A primary selection criteria for a maximum output inductor Lo value is to have less than a 3% to 5% voltage drop at rated load current and rated fundamental frequency. Inductor Lo also functions as the main current limiting component to the applied harmonic voltage amplitudes supplied by the inverter, while resonant configuration 118 elements $L_{f1}$, $C_{f1}$ and $R_{f1}$ and resonant configuration 120 elements $L_{f2}$, $C_{f2}$ and $R_{f2}$ must be sized to minimize the resulting harmonic current magnitude through apparatus 104. Initial selection of Lo according to the primary criteria limits rms harmonic current magnitudes to an acceptable 10% to 20% of rated inverter fundamental output current when the harmonic voltages of Table 1 are applied to apparatus 104. The value of Lo may be increased to reduce the harmonic current magnitude but at the expense of fundamental voltage drop.

Referring still to FIG. 3 resonant frequency $f_{r1}=f_c$ is selected for the series $L_{f1}$, $C_{f1}$, $R_{f1}$ circuit and resonant frequency $f_{r1}=2f_c$ is selected for the series $L_{f2}$, $C_{f2}$, $R_{f2}$ circuit. $L_{f1}$ and $C_{f1}$ values determine resonant frequency $f_{r1}$ using Equation 12 while $L_{f2}$ and $C_{f2}$ values determine resonant frequency $f_{r2}$ using Equation 13. Maximum value for both $L_{f1}$ and $L_{f2}$ is approximately 15%–20% of Lo, so that the higher order harmonics $>2f_c$ are attenuated by (−20 dB) as in FIG. 14 and the filter THD goal of 2% to 6% is met. $C_{f1}$ may then be determined from Equation 12 once $L_{f2}$ is defined. $C_{f2}$ may then be determined using Equation 13 once $L_{f2}$ is defined. The $C_{f2}$ determines the fundamental frequency current flowing in the configuration 118 at the fundamental frequency, while $C_{f2}$ determines the fundamental frequency current flowing in configuration 120. The $L_{f1}$ and $C_{f1}$ values may be adjusted so that <1% of rated inverter output current flows through configuration 104 at the fundamental frequency, for a total of <2% rated current flowing in the filter.

Referring still to FIG. 3 the value for $R_{f1}$ is constrained by minimizing the constrained by minimizing the configuration 120 impedance at the predominant $2f_c$ harmonic. Filter output THD values increase as both $R_{f1}$ and $R_{f2}$ are increased. Thus, maximum $R_{f1}$ magnitude is limited by the necessity to obtain a minimum −30 dB to −40 dB filter output/input attenuation at $f_c$, while maximum $R_{f2}$ value magnitude is limited by the necessity to obtain a minimum −30 dB to −40 dB filter output/input attenuation at $2f_c$. Once again, $R_{f1}$, and $R_{f2}$ resistors perform more of a resonant damping function than a current limiting function. Maximum $R_{f1}$ and $R_{f2}$ value magnitude is also limited by the necessity to be low impedance at higher order harmonics. It is desirable to maintain $R_{f1}$ less than the high frequency impedance of $L_{f1}$ and $R_{f2}$ less than the high frequency impedance of $L_{f2}$ so that the high order harmonics are properly attenuated by $L_{f1}$ in parallel with $L_{f2}$ (see FIG. 8). Thus, $R_{f1}<(2\pi f_h L_{f1})$ for $f_h$ between $f_c$ and $4f_c$ and $R_{f2}<(2\pi f_h L_{f2})$ for $f_h$ between $f_c$ and $4f_c$. Practically, it is desirable to make $R_{f1}=R_{f2}=0$ to minimize power loss. Circuit operation with $R_{f1}=R_{f2}=0$ is possible as long as system resonance conditions are analyzed.

Referring yet again to FIG. 3, configuration 122 may be added to the other apparatus 104 components to lower the 2% THD value. There are two optional functions possible with the configuration 122. The first function is to attenuate only the very high frequency inverter harmonic components defined by $f_u$ in Equation 8 and determined from known inverter pulse rise and fall times. Since IGBT semiconductor risetimes are 100 NS to 400 NS, this translates to $f_u$ frequencies in the range of 800 kHz to 3.2 Mhz. The $f_u$ frequencies can be attenuated by as much as −40 dB by selecting a $C_3$ value to function with the fixed Lo value and set a low pass resonant frequency at frequency $f_u/10$. A large advantage is that the resulting $C_3$ capacitor is thus small in $\mu f$ value at the high resonant frequency value of $f_u/10$ (e.g. 80 kHz to 0.32 Mhz). $R_3$ can be adjusted for attenuation, power loss and system damping as required.

The second functional option for configuration 122 is to attenuate the lower PWM harmonic carrier frequencies beyond $2f_c$, specifically $3f_c$ and $4f_c$. Attenuation beyond $2f_c$ frequencies is a constant −24 dB independent of frequency from FIG. 14 due to the impedance divider ratio between $L_{f1}$ in parallel with $L_{f2}$ and Lo. To get low THD at $3f_c$ and $4f_c$, configuration 122 has to provide another −12 dB to attenuate the lower PWM harmonic carrier frequencies beyond $2f_c$ down to an acceptable −36 dB. A standard second order low pass function can provide −12 dB attenuation @ (f/fr)=2, −19 dB attenuation @ (f/fr)=3 and −24 dB attenuation @ (f/fr)=4. Thus, by setting a low pass resonant frequency cutoff using Lo and configuration 122 at $5f_c$ then a −24 dB plus −12 dB or −36 dB attenuation can be achieved at $3f_c$ and beyond. It is important not to align this low pass resonant frequency with the resonant frequencies of configurations 118 and 120.

Referring to FIG. 7, the inventive filter apparatus consisting of a quad resonant filter configuration is selected as an option when THD values of <2% at 60 Hz is desired. Resonant frequency $f_{r1}=f_c$ is selected for the series $L_{f1}$, $C_{f1}$, $R_{f1}$ configuration 118 to provide −40 dB filter output attenuation of the PWM $f_c$ voltage harmonic. Resonant frequency $f_{r2}=2f_c$ is selected for the series $L_{f2}$, $C_{f2}$, $R_{f2}$ configuration 120 to provide −40 dB filter output attenuation of the PWM $2f_c$ voltage harmonic. Resonant frequency $f_{r3}=3f_c$ is selected for the series $L_{f3}$, $C_{f3}$, $R_{f3}$ configuration 160 to provide −40 dB filter output attenuation of the PWM $3f_c$ voltage harmonic. Resonant frequency $f_{r4}=4f_c$ is selected for the series $L_{f4}$, $C_{f4}$, $R_{f4}$ configuration 162 to provide −40 dB filter output attenuation of the PWM $3f_c$ voltage harmonic. Harmonics beyond $4f_c$ are insignificant according to Table 1 and therefore no further series resonant circuits are required.

Although the parts count of the four separate resonant filter circuits of FIG. 7 appears to be large, the actual physical size of each configuration 160 and 162 is relatively small. This is due in part to the fact that the PWM harmonic voltages at $3f_c$ and $4f_c$ are smaller in amplitude than the $f_c$ and $2f_c$ voltages, resulting in lower Irms current rating for the $3f_c$ and $4f_c$ resonant circuit elements. In addition resonant frequency for the series resonant configurations 160 and 162 are higher leading to smaller capacitance values for $C_{f3}$ and $C_{f4}$.

H. Alternative Embodiments

Figure 16C:
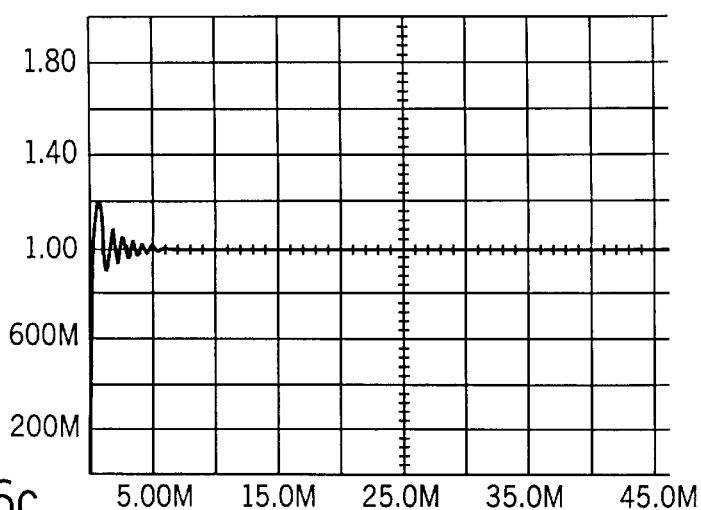
Figure 22:
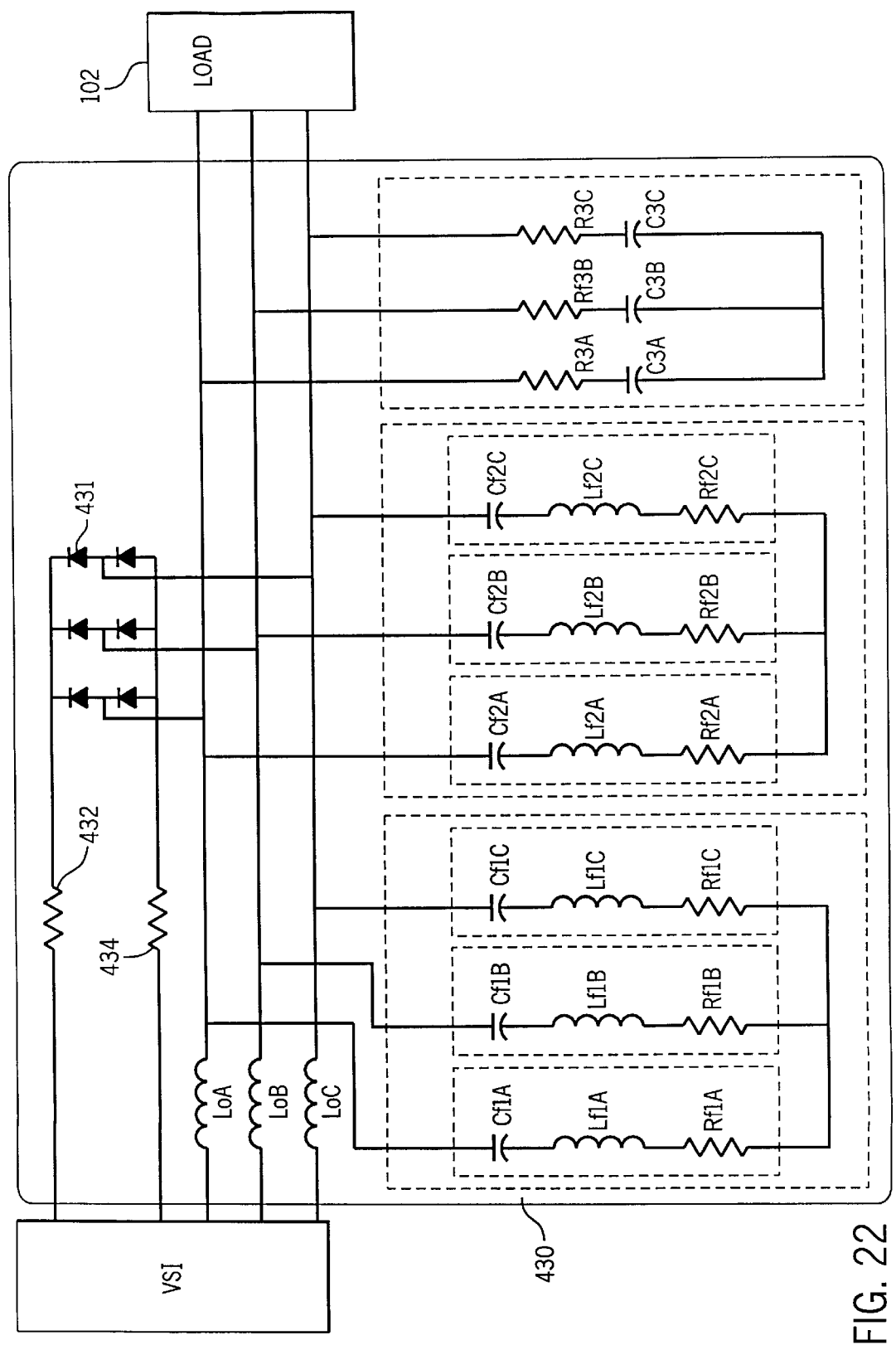
FIG. 22 is a schematic diagram of a yet another inventive filter apparatus similar to the filter apparatus of FIG. 3, albeit including a three-phase diode bridge linking supply cables back to the VSI DC rails.

It should be understood that the methods and apparatuses described above are only exemplary and do not limit the scope of the invention, and that various modifications could be made by those skilled in the art that would fall under the scope of the invention. For example, referring to FIG. 22, an alternative apparatus 430 to the basic inventive apparatus can be employed to obtain faster transient response. Apparatus 430 is identical to apparatus 104 of FIG. 3 except that apparatus 430 also includes an additional three phase diode bridge 431 with its three phase input connected to the inventive filter outputs. A VSI+DC bridge output is connected by a low ohmic value resistor 432 to the +DC VSI terminal while a −DC bridge output is connected by another low ohmic value resistor 434 to the −DC VSI terminal. In this fashion energy stored in the output inductor $L_o$ during the initial step interval will first be transferred to the filter output capacitors. When the output phase voltage magnitude exceeds the DC bus voltage the energy is then transferred through bridge 431 to the bridge resistors and to a large DC bus capacitor (not illustrated) which typically has a capacitance value 100×greater than the output filter capacitor. Referring also to FIG. 16c, therein are illustrated circuit simulation results for FIG. 22 including bridge output resistors of 0.1 ohm and a 10,000 uf DC bus capacitor which can limit peak output overshoot voltage to 1.2 pu and decay the resulting transient to zero in <5ms.

Figure 23:
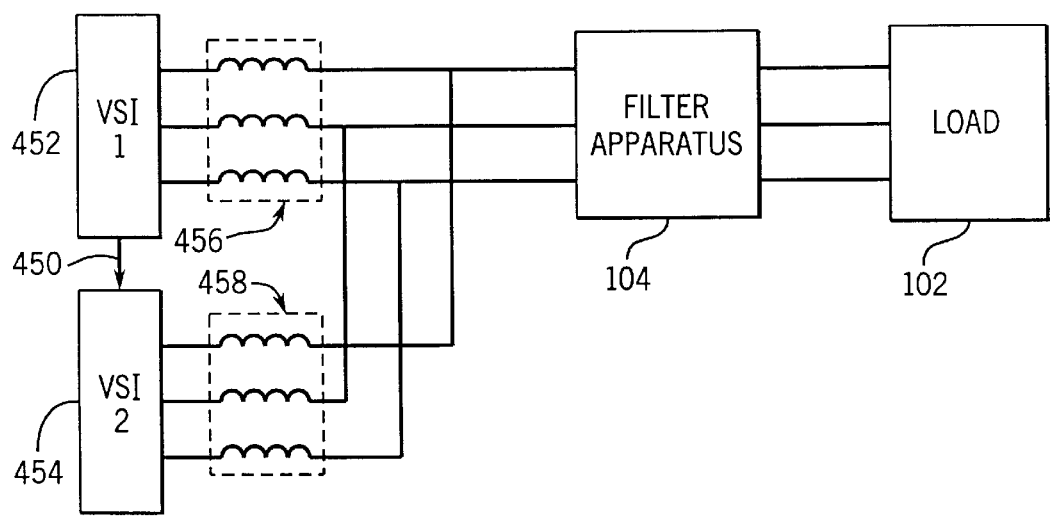
FIG. 23 is a schematic diagram of a filter apparatus similar to the apparatus of FIG. 3, albeit linked to parallel VSIs used to obtain higher horsepower ratings and which does not include line inductors.

FIG. 23 is a schematic diagram of an alternate system configuration consisting of parallel voltage source inverters to obtain higher horsepower ratings and which also uses a variation of the basic inventive filter topology of FIG. 3. A signal line 450 is used to synchronize the gate firing control signals for a first PWM VSI 452 with the gate firing control signals for a second PWM VSI 454. Output inductors 456 and 458 are required to absorb any small voltage difference between VSI 452 and VSI 454 pulses which might occur as a result of circuit signal and gate firing delays. Inductors 456 include first, second and third inductors (not separately numbered) which link separate phases of VSI 452 to distinct supply lines via filter 104. Similarly, inductors 458 include fourth, fifth and sixth inductors (not separately numbered) which link separate phases of VSI 454 to distinct supply lines via filter 104. Since inductors 456 and 458 exist as a necessity of paralleling inverters, the basic inventive filter can be simplified in this topology by replacing the harmonic current limiting function of output line inductor Lo of FIG. 3 with inductors 456 and 458 which are connected to the input of the modified inventive apparatus. Similar modifications may be made to the apparatus of FIGS. 7 and 9. Another modification may include the front end of FIG. 23 and the transformer end of FIG. 20.

Figure 24:
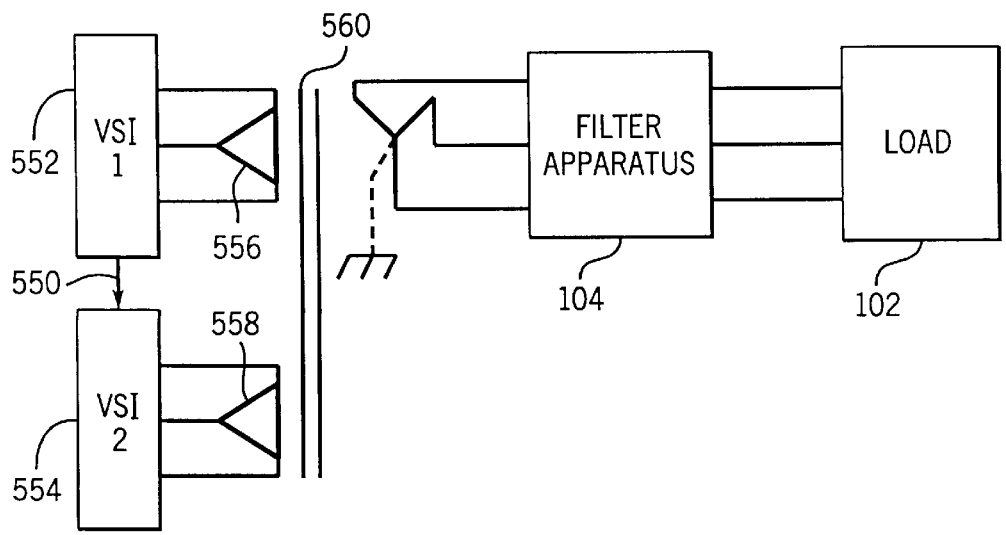
FIG. 24 is a schematic diagram of a filter apparatus similar to the apparatus of FIG. 3, albeit linked to parallel VSIs via a two-primary/single secondary step up or step down transformer.

FIG. 24 is a schematic diagram of another alternate system configuration consisting of parallel voltage source inverters to obtain higher horsepower ratings and which uses a variation of the basic inventive filter topology of FIG. 3 with the filter apparatus 104 between an output transformer 560 and a load 102. A signal line 550 is used to synchronize the gate control firing signals for a first PWM VSI 552 with the gate firing control signals for a second PWM VSI 554. The inherent transformer primary leakage reactance of each of the delta primary circuits 556 and 558 of transformer 560 functions to provide required inductance to absorb any small voltage difference between VSI 552 and VSI 554 pulses which might occur as a result of circuit signal and gate firing delay. Since the transformer primary circuit inductance's 556 and 558 exist as a necessity of paralleling inverters, the basic inventive filter can be simplified in this topology by replacing the harmonic current limiting function of output line inductor Lo of FIG. 3 with the primary leakage inductance's of 556 and 558. Inductance's 556 and 558 are equivalently series-connected to the input of the modified inventive filter apparatus. Similar modification may be made to the apparatus of FIGS. 7 and 9. Another derived modification of FIG. 24 that operates in a similar function to the aforementioned may include only a single VSI inverter 552 connected to an output transformer, modified filter apparatus 104 and load 102.

Other transformer configurations are also contemplated.

To appraise the public of the scope of this invention, the following claims are made:

What is claimed is:

1. An apparatus for reducing reflected line voltages on AC supply lines of an AC motor, the motor having first, second and third stator windings, each winding separately connected to an alternating voltage source by either a first, second or third supply line, the voltage source supplying high frequency voltage pulses on each supply line, the apparatus comprising:

a current limiter positioned between the source and motor to limit current on the supply lines;

N filter configurations, each filter configuration comprising:

a first leg including a first voltage storage element and a first inductive element arranged in series between the first line and a common node;

a second leg including a second voltage storage element and a second inductive element arranged in series between the second line and the common node; and a third leg including a third voltage storage element and a third inductive element arranged in series between the third line and the common node;

wherein the common node is only linked to the legs;

wherein inductive elements in the same filter configuration have essentially the same values and voltage storage elements in the same filter configuration have essentially the same values.

2. The apparatus of claim 1 wherein N is 1 and the supply provides voltages including harmonics at at least one primary harmonic frequency and wherein the elements in each leg are selected such that the leg resonant frequency is the primary harmonic frequency.

3. The apparatus of claim 2 wherein each leg further includes a resistive element in series with the leg inductive and storage devices.

4. The apparatus of claim 3 wherein each of the inductive elements is an inductor and each resistive element has a resistance which is substantially less than the impedance of the series inductor at frequencies higher than the primary harmonic frequency.

5. The apparatus of claim 4 wherein the current limiter includes first, second and third line inductors which are arranged in series between the source and the motor in the first, second and third supply lines, respectively.

6. The apparatus of claim 1 wherein the current limiter includes first, second and third line inductors which are arranged in series between the source and the motor in the first, second and third supply lines, respectively.

7. The apparatus of claim 6 wherein the motor is characterized by a rated load current and rated fundamental frequency and the line inductors are selected such that each line inductor has less than a 10% voltage drop at the rated current and fundamental frequency.

8. The apparatus of claim 7 wherein the line inductors are selected such that each line inductor has less than 5% voltage drop at the rated current and fundamental frequency.

9. The apparatus of claim 6 wherein the inductive elements are filter inductors and their maximum values are less than 25% of the value of one of the line inductors.

10. The apparatus of claim 9 wherein the filter inductor values are 15 to 20 percent of the value of one of the line inductors.

11. The apparatus of claim 2 wherein the source is a pulse width modulated voltage source inverter which is characterized by a carrier frequency and wherein the resonant frequency of the storage and inductive elements in each leg is the carrier frequency.

12. The apparatus of claim 2 wherein the source is a pulse width modulated voltage source inverter which is characterized by a carrier frequency and wherein the resonant frequency of the storage and inductive elements in each leg is two times the carrier frequency.

13. The apparatus of claim 1 wherein N is greater than 1 and the supply provides voltages including harmonics at at least N primary harmonic frequencies and wherein the elements in each configuration are selected such that elements in each leg in the same configuration resonate at one of the primary harmonic frequencies and elements in each configuration resonate at a different primary frequencies than elements in the other configurations.

14. The apparatus of claim 13 wherein each leg also includes a resistive element in series with the inductive and storage elements.

15. The apparatus of claim 13 further including a high frequency filter configuration linked to the first, second and third lines between the filter configuration and the load.

16. The apparatus of claim 15 wherein the high frequency filter configuration includes:
  a first leg including a resistive element in series with a voltage storage element linked between the first line and a high frequency common node;
  a second leg including a resistive element in series with a voltage storage element linked between the second line and the high frequency common node; and
  a third leg including a resistive element in series with a voltage storage element linked between the third line and the high frequency common node.

17. The apparatus of claim 13 wherein N is 2.

18. The apparatus of claim 1 wherein each leg also includes a resistive element in series with the inductive and storage elements.

19. The apparatus of claim 1 wherein the voltage storage elements are capacitors and the inductive elements are inductors.

20. The apparatus of claim 1 also including a high frequency filter comprising:
  a first leg including a resistive element in series with a voltage storage element linked between the first line and a high frequency common node;
  a second leg including a resistive element in series with a voltage storage element linked between the second line and the high frequency common node; and
  a third leg including a resistive element in series with a voltage storage element linked between the third line and the high frequency common node.

21. A system for reducing reflected line voltages on AC supply lines of an AC motor, the motor having first, second and third stator windings which are linked to first, second and third voltage supply lines, the first, second and third supply lines linked to separate first, second and third phases of a voltage source inverter (VSI), the system comprising:
  an apparatus comprising:
    N filter configurations, each filter configuration comprising:
      a first leg including a first voltage storage element and a first inductive element arranged in series between the VSI first phase and a common node;
      a second leg including a second voltage storage element and a second inductive element arranged in series between the VSI second phase and the common node; and
      a third leg including a third voltage storage element and a third inductive element arranged in series between the VSI third phase and the common node;
      the common node is only linked to the legs;
      wherein inductive elements in the same filter configuration have essentially the same values and voltage storage elements in the same filter configuration have essentially the same values.

22. The system of claim 21 further including a transformer including primary and secondary windings, the transformer linking the three VSI phases to the first, second and third voltage supply lines.

23. The system of claim 22 wherein the apparatus is linked between the transformer and the supply lines.

24. The apparatus of claim 21 wherein N is 1 and the supply provides voltages including harmonics at least one primary harmonic frequency and wherein the elements in each leg are selected such that the leg resonant frequency is the primary harmonic frequency.

25. The apparatus of claim 24 wherein each leg further includes a resistive element in series with the leg inductive and storage devices.

26. The apparatus of claim 24 wherein the source is a pulse width modulated voltage source inverter which is characterized by a carrier frequency and wherein the resonant frequency of the storage and inductive elements in each leg is the carrier frequency.

27. The apparatus of claim 24 wherein the source is a pulse width modulated voltage source inverter which is characterized by a carrier frequency and wherein the resonant frequency of the storage and inductive elements in each leg is two times the carrier frequency.

28. The apparatus of claim 21 wherein N is greater than 1 and the supply provides voltages including harmonics at least N primary harmonic frequencies and wherein the elements in each configuration are selected such that elements in each leg in the same configuration resonate at one of the primary harmonic frequencies and elements in each configuration resonate at a different primary frequencies than elements in the other configurations.

29. A system for providing voltages on AC supply lines of an AC motor, the motor having first, second and third stator windings which are linked to first, second and third voltage supply lines, the system comprising:

a transformer including first and second primary windings and at least one secondary winding, the transformer secondary windings linked to the first, second and third supply lines;

a first three phase voltage source inverter linked to the first primary winding;

a second three phase voltage source inverter linked to the second primary winding; and N filter configurations, each filter configuration comprising:

a first leg including a first voltage storage element and a first inductive element arranged in series between the first line and a common node;

a second leg including a second voltage storage element and a second inductive element arranged in series between the second line and the common node; and a third leg including a third voltage storage element and a third inductive element arranged in series between the third line and the common node;

wherein the common node is only lined to the legs;

wherein inductive elements in the same filter configuration have essentially the same values and voltage storage elements in the same filter configuration have essentially the same values.

30. The apparatus of claim 29 wherein N is 1 and the supply provides voltages including harmonics at least one primary harmonic frequency and wherein the elements in each leg are selected such that the leg resonant frequency is the primary harmonic frequency.

31. The apparatus of claim 29 wherein N is greater than 1 and the supply provides voltages including harmonics at at least N primary harmonic frequencies and wherein the elements in each configuration are selected such that elements in each leg in the same configuration resonate at one of the primary harmonic frequencies and elements in each configuration resonate at a different primary frequencies than elements in the other configurations.

32. A system for providing low harmonic voltages on AC supply lines of an AC motor, the motor having first, second and third stator windings which are linked to first, second and third voltage supply lines, the system comprising:

a first voltage source inverter (VSI) including first VSI first, second and third phases;

a second VSI including second VSI first, second and third phases;

a first inductor set including first, second and third inductors which link the first VSI first, second and third phases to the first, second and third supply lines, respectively;

a second inductor set including fourth, fifth and sixth inductors which link the second VSI first, second and third phases to the first, second and third supply lines, respectively; and an apparatus including N filter configurations, each filter configuration comprising:

a first leg including a first voltage storage element and a first inductive element arranged in series between the first line and a common node;

a second leg including a second voltage storage element and a second inductive element arranged in series between the second line and the common node; and a third leg including a third voltage storage element and a third inductive element arranged in series between the third line and the common node;

wherein the common node is only linked to the legs;

wherein inductive elements in the same filter configuration have essentially the same values and voltage storage elements in the same filter configuration have essentially the same values.

33. The apparatus of claim 32 wherein N is 1 and the supply provides voltages including harmonics at least one primary harmonic frequency and wherein the elements in each leg are selected such that the leg resonant frequency is the primary harmonic frequency.

34. The apparatus of claim 32 wherein N is greater than 1 and the supply provides voltages including harmonics at at least N primary harmonic frequencies and wherein the elements in each configuration are selected such that elements in each leg in the same configuration resonate at one of the primary harmonic frequencies and elements in each configuration resonate at a different primary frequencies than elements in the other configurations.

35. An apparatus for reducing reflected line voltages on AC supply lines of an AC motor, the motor having first, second and third stator windings which are linked to first, second and third voltage supply lines, the first, second and third supply lines connected to separate phases of a three phase voltage source inverter (VSI), the apparatus comprising:

N filter configurations, each filter configuration comprising:

a first leg including a first voltage storage element and a first inductive element arranged in series between the first line and a common node;

a second leg including a second voltage storage element and a second inductive element arranged in series between the second line and the common node; and a third leg including a third voltage storage element and a third inductive element arranged in series between the third line and the common node;

wherein the common node is only linked to the legs;

wherein inductive elements in the same filter configuration have essentially the same values and voltage storage elements in the same filter configuration have essentially the same values.

* * * * *